(12) United States Patent
Podgorny et al.

(10) Patent No.: US 11,093,951 B1
(45) Date of Patent: Aug. 17, 2021

(54) SYSTEM AND METHOD FOR RESPONDING TO SEARCH QUERIES USING CUSTOMER SELF-HELP SYSTEMS ASSOCIATED WITH A PLURALITY OF DATA MANAGEMENT SYSTEMS

(71) Applicant: Intuit Inc., Mountain View, CA (US)

(72) Inventors: Igor A. Podgorny, San Diego, CA (US); Benjamin Indyk, San Diego, CA (US); Faraz Sharafi, San Diego, CA (US); Matthew Cannon, San Diego, CA (US); Darren Duc Dao, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 984 days.

(21) Appl. No.: 15/714,256

(22) Filed: Sep. 25, 2017

(51) Int. Cl.
*G06Q 30/00* (2012.01)
*G06N 3/00* (2006.01)
*G06N 5/04* (2006.01)
*G06N 20/00* (2019.01)

(52) U.S. Cl.
CPC ........... *G06Q 30/016* (2013.01); *G06N 3/006* (2013.01); *G06N 5/04* (2013.01); *G06N 20/00* (2019.01)

(58) Field of Classification Search
CPC ..................................................... G06N 5/04
See application file for complete search history.

(56) References Cited

U.S. PATENT DOCUMENTS

| | | |
|---|---|---|
| 5,471,382 A | 11/1995 | Tallman et al. |
| 5,519,608 A | 5/1996 | Kupiec |
| 5,701,399 A | 12/1997 | Lee et al. |
| 6,006,218 A | 12/1999 | Breese et al. |
| 6,147,975 A | 11/2000 | Bowman-Amuah |
| 6,256,633 B1 | 7/2001 | Dharap |
| 6,349,307 B1 | 2/2002 | Chen |
| 6,513,036 B2 | 1/2003 | Fruensgaard et al. |
| 6,564,213 B1 | 5/2003 | Ortega et al. |

(Continued)

FOREIGN PATENT DOCUMENTS

| | | |
|---|---|---|
| AU | 2001259223 B2 | 11/2001 |
| CN | 101520802 | 4/2009 |

(Continued)

OTHER PUBLICATIONS

Garg et al. (Mining Top Issues from Contact Center Logs for Self Help Portals, Jul. 2008, pp. 171-178 (Year: 2008).*

(Continued)

*Primary Examiner* — George Giroux
(74) *Attorney, Agent, or Firm* — Paradice and Li LLP

(57) ABSTRACT

A customer self-help system employs artificial intelligence and machine learning to identify self-help content that is responsive to a user query by analyzing and searching a plurality of customer self-help systems. The customer self-help system generates a self-help relationship model by applying one or more processes/algorithms on training set data. In response to a user query, the customer self-help system identifies ones of the plurality of customer self-help systems that are relevant to the user query and searches the relevant ones of the plurality of customer self-help systems for self-help content that is responsive to the user query. The customer self-help system then provides the self-help content to the user in response to receipt of the user query from the user.

19 Claims, 6 Drawing Sheets

(56) References Cited

U.S. PATENT DOCUMENTS

| | | |
|---|---|---|
| 6,601,055 B1 | 7/2003 | Roberts |
| 6,708,172 B1 | 3/2004 | Wong et al. |
| 6,853,982 B2 | 2/2005 | Smith et al. |
| 7,013,263 B1 | 3/2006 | Isaka et al. |
| 7,222,078 B2 | 5/2007 | Abelow |
| 7,385,716 B1 | 6/2008 | Skaanning |
| 7,565,312 B1 | 7/2009 | Shaw et al. |
| 7,587,387 B2 | 9/2009 | Hogue |
| 7,594,176 B1 | 9/2009 | English |
| 7,603,301 B1 | 10/2009 | Regan |
| 7,610,226 B1 | 10/2009 | Miller |
| 7,627,504 B2 | 12/2009 | Brady et al. |
| 7,685,144 B1 | 3/2010 | Katragadda |
| 7,739,286 B2 | 6/2010 | Sethy et al. |
| 7,747,601 B2 | 6/2010 | Cooper et al. |
| 7,966,282 B2 | 6/2011 | Pinckney et al. |
| 7,974,860 B1 | 7/2011 | Travis |
| 8,010,545 B2 | 8/2011 | Stefik et al. |
| 8,019,753 B2 | 9/2011 | Podgorny et al. |
| 8,200,527 B1 | 6/2012 | Thompson et al. |
| 8,209,333 B2 | 6/2012 | Hubbard et al. |
| 8,271,471 B1 | 9/2012 | Kamvar et al. |
| 8,311,792 B1 | 11/2012 | Podgorny et al. |
| 8,311,863 B1 | 11/2012 | Kemp |
| 8,341,167 B1 | 12/2012 | Podgorny et al. |
| 8,473,339 B1 | 6/2013 | McKennon et al. |
| 8,478,780 B2 | 7/2013 | Cooper et al. |
| 8,484,228 B2 | 7/2013 | Bhattacharyya et al. |
| 8,631,006 B1 | 1/2014 | Haveliwala et al. |
| 8,645,298 B2 | 2/2014 | Hennig et al. |
| 8,660,849 B2 | 2/2014 | Gruber et al. |
| 8,732,222 B2 | 5/2014 | Horvitz et al. |
| 8,805,734 B2 | 8/2014 | Diana et al. |
| 8,817,968 B1 | 8/2014 | Boutcher et al. |
| 8,850,490 B1 | 9/2014 | Thomas et al. |
| 8,892,539 B2 | 11/2014 | Anand et al. |
| 8,909,568 B1 | 12/2014 | Mann et al. |
| 8,935,192 B1 | 1/2015 | Ventilla et al. |
| 8,943,145 B1 | 1/2015 | Peters et al. |
| 8,983,977 B2 | 3/2015 | Ishikawa et al. |
| 9,015,031 B2 | 4/2015 | Ferrucci et al. |
| 9,037,578 B2 | 5/2015 | Brust et al. |
| 9,060,062 B1 | 6/2015 | Madahar et al. |
| 9,063,983 B1 | 6/2015 | Lee |
| 9,229,974 B1 | 1/2016 | Lee et al. |
| 9,235,626 B2 | 1/2016 | Liu et al. |
| 9,247,066 B1 | 1/2016 | Stec et al. |
| 9,336,211 B1 | 5/2016 | Bousquet et al. |
| 9,336,269 B1 | 5/2016 | Smith et al. |
| 9,342,608 B2 | 5/2016 | Cook et al. |
| 9,460,191 B1 | 10/2016 | Gaucher et al. |
| 9,471,883 B2 | 10/2016 | Chatterjee et al. |
| 9,582,757 B1 | 2/2017 | Holmes et al. |
| 9,633,309 B2 | 4/2017 | Giffels et al. |
| 9,767,169 B1 | 9/2017 | Paff et al. |
| 9,779,388 B1 | 10/2017 | Hansen et al. |
| 9,887,887 B2 | 2/2018 | Hunter et al. |
| 9,892,367 B2 | 2/2018 | Guo et al. |
| 9,910,886 B2 | 3/2018 | Adams, Jr. et al. |
| 10,002,177 B1 | 6/2018 | McClintock et al. |
| 10,049,664 B1 | 8/2018 | Indyk et al. |
| 10,083,213 B1 | 9/2018 | Podgorny et al. |
| 10,134,050 B1 | 11/2018 | Hung et al. |
| 10,147,037 B1 | 12/2018 | Podgorny et al. |
| 10,162,734 B1 | 12/2018 | Podgorny et al. |
| 10,210,244 B1 | 2/2019 | Branavan et al. |
| 10,354,182 B2 | 7/2019 | Chang et al. |
| 10,460,398 B1 | 10/2019 | Gielow et al. |
| 10,475,044 B1 | 11/2019 | Cannon et al. |
| 10,522,134 B1 | 12/2019 | Matsoukas |
| 10,552,843 B1 | 2/2020 | Podgorny et al. |
| 10,579,625 B2 | 3/2020 | Cho et al. |
| 10,748,157 B1 | 8/2020 | Indyk et al. |
| 10,755,294 B1 | 8/2020 | Podgorny et al. |
| 2002/0087387 A1 | 7/2002 | Calver et al. |
| 2002/0111888 A1 | 8/2002 | Stanley et al. |
| 2002/0111926 A1 | 8/2002 | Bebie |
| 2002/0123983 A1 | 9/2002 | Riley et al. |
| 2002/0169595 A1 | 11/2002 | Agichtein et al. |
| 2003/0028448 A1 | 2/2003 | Joseph et al. |
| 2003/0061131 A1 | 3/2003 | Parkan |
| 2003/0099924 A1 | 5/2003 | Tsuboi et al. |
| 2003/0101161 A1 | 5/2003 | Ferguson et al. |
| 2003/0115318 A1* | 6/2003 | Wueste ............... G06F 16/9535 709/224 |
| 2003/0144873 A1 | 7/2003 | Keshel |
| 2004/0024739 A1 | 2/2004 | Copperman et al. |
| 2004/0034652 A1 | 2/2004 | Hofmann et al. |
| 2004/0064442 A1 | 4/2004 | Popovitch |
| 2005/0086290 A1 | 4/2005 | Joyce et al. |
| 2005/0114327 A1 | 5/2005 | Kumamoto et al. |
| 2005/0137939 A1 | 6/2005 | Calabria et al. |
| 2005/0222989 A1 | 10/2005 | Haveliwala et al. |
| 2005/0246314 A1 | 11/2005 | Eder |
| 2006/0064322 A1 | 3/2006 | Mascarenhas et al. |
| 2006/0074788 A1 | 4/2006 | Grizack et al. |
| 2006/0085255 A1 | 4/2006 | Hastings et al. |
| 2006/0085750 A1 | 4/2006 | Easton et al. |
| 2006/0253578 A1 | 11/2006 | Dixon et al. |
| 2006/0265232 A1 | 11/2006 | Katariya et al. |
| 2007/0011131 A1 | 1/2007 | Delefevre |
| 2007/0143262 A1 | 6/2007 | Kasperski |
| 2007/0192166 A1 | 8/2007 | Van Luchene |
| 2007/0192168 A1 | 8/2007 | Van Luchene |
| 2007/0192179 A1 | 8/2007 | Van Luchene |
| 2007/0219863 A1 | 9/2007 | Park et al. |
| 2007/0244900 A1 | 10/2007 | Hopkins et al. |
| 2007/0259325 A1 | 11/2007 | Clapper |
| 2007/0291739 A1 | 12/2007 | Sullivan et al. |
| 2007/0294195 A1 | 12/2007 | Curry et al. |
| 2008/0189197 A1 | 8/2008 | Allanson et al. |
| 2008/0201413 A1 | 8/2008 | Sullivan et al. |
| 2008/0208610 A1 | 8/2008 | Thomas et al. |
| 2008/0214151 A1 | 9/2008 | Ramer et al. |
| 2008/0215541 A1 | 9/2008 | Li et al. |
| 2008/0248815 A1 | 10/2008 | Busch |
| 2008/0294637 A1 | 11/2008 | Liu |
| 2009/0012926 A1 | 1/2009 | Ishikawa et al. |
| 2009/0077047 A1 | 3/2009 | Cooper et al. |
| 2009/0089286 A1 | 4/2009 | Kumar et al. |
| 2009/0106224 A1 | 4/2009 | Roulland et al. |
| 2009/0119575 A1 | 5/2009 | Velusamy |
| 2009/0158143 A1 | 6/2009 | Arav |
| 2009/0162824 A1 | 6/2009 | Heck |
| 2009/0198667 A1 | 8/2009 | Groeneveld et al. |
| 2009/0248659 A1 | 10/2009 | McCool et al. |
| 2009/0253112 A1 | 10/2009 | Cao et al. |
| 2009/0259642 A1 | 10/2009 | Cao et al. |
| 2009/0265340 A1 | 10/2009 | Barcklay et al. |
| 2009/0292609 A1 | 11/2009 | Vaidyanathan |
| 2010/0017388 A1* | 1/2010 | Glover ............... G06F 16/9535 707/E17.001 |
| 2010/0068687 A1 | 3/2010 | Bertelsen |
| 2010/0070554 A1 | 3/2010 | Richardson et al. |
| 2010/0076847 A1 | 3/2010 | Heller |
| 2010/0076998 A1 | 3/2010 | Podgorny et al. |
| 2010/0088262 A1 | 4/2010 | Visel et al. |
| 2010/0138451 A1 | 6/2010 | Henkin et al. |
| 2010/0185630 A1 | 7/2010 | Cheng et al. |
| 2010/0191686 A1 | 7/2010 | Wang et al. |
| 2010/0203492 A1 | 8/2010 | Nibe et al. |
| 2010/0205180 A1 | 8/2010 | Cooper et al. |
| 2010/0205550 A1 | 8/2010 | Chen et al. |
| 2010/0228744 A1 | 9/2010 | Craswell et al. |
| 2010/0235361 A1 | 9/2010 | Chandran et al. |
| 2010/0241507 A1 | 9/2010 | Quinn et al. |
| 2010/0241971 A1 | 9/2010 | Zuber |
| 2010/0318919 A1 | 12/2010 | Murphy et al. |
| 2011/0055110 A1 | 3/2011 | Kolyvanov et al. |
| 2011/0055699 A1* | 3/2011 | Li ............... G06F 16/951 715/709 |
| 2011/0071997 A1 | 3/2011 | Sullivan et al. |
| 2011/0106895 A1 | 5/2011 | Ventilla et al. |
| 2011/0125734 A1 | 5/2011 | Duboue et al. |

(56) References Cited

U.S. PATENT DOCUMENTS

| | | |
|---|---|---|
| 2011/0202472 A1 | 8/2011 | Wan et al. |
| 2011/0231347 A1 | 9/2011 | Xu et al. |
| 2011/0246334 A1 | 10/2011 | Schoenberg et al. |
| 2011/0264569 A1 | 10/2011 | Houseworth et al. |
| 2011/0282892 A1 | 11/2011 | Castellani et al. |
| 2011/0295612 A1 | 12/2011 | Donneau-Golencer et al. |
| 2012/0005148 A1 | 1/2012 | Horvitz et al. |
| 2012/0005219 A1 | 1/2012 | Apacible et al. |
| 2012/0022983 A1 | 1/2012 | Hughes et al. |
| 2012/0030079 A1 | 2/2012 | Slater et al. |
| 2012/0077178 A1 | 3/2012 | Bagchi et al. |
| 2012/0084120 A1 | 4/2012 | Hirsch et al. |
| 2012/0084185 A1 | 4/2012 | Ciaramitaro et al. |
| 2012/0084279 A1 | 4/2012 | Driscoll et al. |
| 2012/0084293 A1 | 4/2012 | Brown et al. |
| 2012/0095976 A1 | 4/2012 | Hebenthal et al. |
| 2012/0101965 A1 | 4/2012 | Hennig et al. |
| 2012/0130910 A1 | 5/2012 | Al-Alami |
| 2012/0130978 A1 | 5/2012 | Li et al. |
| 2012/0136764 A1 | 5/2012 | Miller et al. |
| 2012/0150861 A1 | 6/2012 | Thione et al. |
| 2012/0166438 A1 | 6/2012 | Wu et al. |
| 2012/0219142 A1 | 8/2012 | Gould |
| 2012/0221557 A1 | 8/2012 | Edmonds et al. |
| 2012/0233191 A1 | 9/2012 | Ramanujam |
| 2012/0331052 A1 | 12/2012 | Rathod |
| 2013/0019286 A1 | 1/2013 | Barborak et al. |
| 2013/0024290 A1 | 1/2013 | Berg et al. |
| 2013/0054497 A1 | 2/2013 | Garland et al. |
| 2013/0066693 A1 | 3/2013 | Laird-McConnell et al. |
| 2013/0073387 A1 | 3/2013 | Heath |
| 2013/0073390 A1 | 3/2013 | Konig et al. |
| 2013/0103493 A1 | 4/2013 | Gao et al. |
| 2013/0110671 A1 | 5/2013 | Gray |
| 2013/0110823 A1 | 5/2013 | Su et al. |
| 2013/0111323 A1 | 5/2013 | Taghaddos et al. |
| 2013/0117677 A1 | 5/2013 | St. Jacques, Jr. |
| 2013/0124449 A1* | 5/2013 | Pinckney ............... G06N 5/045 706/52 |
| 2013/0159233 A1* | 6/2013 | Mason ................. G06F 16/951 706/45 |
| 2013/0204876 A1 | 8/2013 | Szucs et al. |
| 2013/0224713 A1 | 8/2013 | Ajmera et al. |
| 2013/0268319 A1 | 10/2013 | Palombo |
| 2013/0275408 A1 | 10/2013 | Rodriguez et al. |
| 2013/0282363 A1 | 10/2013 | Fan et al. |
| 2013/0285855 A1 | 10/2013 | Dupray et al. |
| 2013/0297545 A1 | 11/2013 | Bierner et al. |
| 2013/0297553 A1 | 11/2013 | Bierner |
| 2013/0297625 A1 | 11/2013 | Bierner et al. |
| 2013/0304730 A1 | 11/2013 | Zhou |
| 2013/0325992 A1 | 12/2013 | McGann et al. |
| 2013/0339870 A1 | 12/2013 | Tandra Sishtla et al. |
| 2014/0006012 A1 | 1/2014 | Zhou et al. |
| 2014/0022328 A1 | 1/2014 | Gechter et al. |
| 2014/0052496 A1 | 2/2014 | Diana et al. |
| 2014/0052606 A1 | 2/2014 | Vasudevan et al. |
| 2014/0052716 A1* | 2/2014 | Chakra ................ G06F 16/951 707/723 |
| 2014/0075004 A1 | 3/2014 | Van Dusen et al. |
| 2014/0088944 A1 | 3/2014 | Natarajan et al. |
| 2014/0114822 A1 | 4/2014 | Sharma et al. |
| 2014/0119531 A1 | 5/2014 | Tuchman et al. |
| 2014/0172883 A1 | 6/2014 | Clark et al. |
| 2014/0181652 A1 | 6/2014 | Stanke et al. |
| 2014/0189829 A1 | 7/2014 | McLachlan et al. |
| 2014/0195613 A1 | 7/2014 | Ogilvie |
| 2014/0201045 A1 | 7/2014 | Pai et al. |
| 2014/0222669 A1 | 8/2014 | Novak et al. |
| 2014/0244528 A1 | 8/2014 | Zhang et al. |
| 2014/0280055 A1 | 9/2014 | Chang et al. |
| 2014/0280070 A1 | 9/2014 | George et al. |
| 2014/0308648 A1 | 10/2014 | Jain |
| 2014/0316856 A1 | 10/2014 | Williams et al. |
| 2014/0324856 A1 | 10/2014 | Lahiani et al. |
| 2014/0337257 A1 | 11/2014 | Chatterjee et al. |
| 2014/0372980 A1 | 12/2014 | Verma et al. |
| 2015/0006344 A1 | 1/2015 | Saimani et al. |
| 2015/0052087 A1 | 2/2015 | Srinivasan et al. |
| 2015/0058380 A1 | 2/2015 | Polonsky et al. |
| 2015/0088608 A1 | 3/2015 | Cama et al. |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0170049 A1 | 6/2015 | Mann et al. |
| 2015/0213021 A1 | 7/2015 | He et al. |
| 2015/0229531 A1 | 8/2015 | O'Sullivan et al. |
| 2015/0242906 A1 | 8/2015 | Liu et al. |
| 2015/0254785 A1 | 9/2015 | Yang |
| 2015/0278241 A1* | 10/2015 | Bates-Haus ........... G06F 16/215 707/692 |
| 2015/0317197 A1 | 11/2015 | Blair |
| 2015/0324367 A1 | 11/2015 | Aravamudan et al. |
| 2015/0324805 A1 | 11/2015 | Skiba et al. |
| 2015/0363481 A1 | 12/2015 | Haynes |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0062980 A1 | 3/2016 | Boguraev et al. |
| 2016/0078567 A1 | 3/2016 | Goldman et al. |
| 2016/0103833 A1 | 4/2016 | Sanders et al. |
| 2016/0147760 A1 | 5/2016 | N et al. |
| 2016/0148222 A1 | 5/2016 | Davar et al. |
| 2016/0148321 A1 | 5/2016 | Ciaramitaro et al. |
| 2016/0154856 A1 | 6/2016 | Olof-Ors et al. |
| 2016/0179816 A1 | 6/2016 | Glover |
| 2016/0180470 A1 | 6/2016 | Mascaro et al. |
| 2016/0188731 A1 | 6/2016 | Dai et al. |
| 2016/0189029 A1 | 6/2016 | Giffels et al. |
| 2016/0196497 A1 | 7/2016 | Allen et al. |
| 2016/0203523 A1 | 7/2016 | Spasojevic et al. |
| 2016/0217472 A1 | 7/2016 | Podgorny et al. |
| 2016/0247165 A1 | 8/2016 | Ryabchun et al. |
| 2016/0283491 A1 | 9/2016 | Lu et al. |
| 2016/0306846 A1 | 10/2016 | Adams, Jr. et al. |
| 2016/0371276 A1 | 12/2016 | Furtado et al. |
| 2017/0011352 A1 | 1/2017 | Jones-McFadden et al. |
| 2017/0017899 A1* | 1/2017 | Maor .................. G06F 16/2456 |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0046623 A1 | 2/2017 | Murdock et al. |
| 2017/0053026 A1 | 2/2017 | Musuluri et al. |
| 2017/0124184 A1 | 5/2017 | Podgorny et al. |
| 2017/0213130 A1 | 7/2017 | Khatri et al. |
| 2017/0228459 A1 | 8/2017 | Wang et al. |
| 2017/0262529 A1 | 9/2017 | Chim et al. |
| 2017/0262900 A1 | 9/2017 | Ramachandran et al. |
| 2017/0270159 A1 | 9/2017 | Wang et al. |
| 2017/0308613 A1 | 10/2017 | Zhu et al. |
| 2017/0323233 A1 | 11/2017 | Bencke et al. |
| 2018/0032523 A1 | 2/2018 | Singhal et al. |
| 2018/0032607 A1 | 2/2018 | Singhal et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2018/0137203 A1 | 5/2018 | Hennekey et al. |
| 2018/0174055 A1 | 6/2018 | Tirumale et al. |
| 2018/0189292 A1 | 7/2018 | Grace, Jr. et al. |
| 2018/0196796 A1 | 7/2018 | Wu |
| 2018/0204106 A1 | 7/2018 | Beller et al. |
| 2018/0287968 A1 | 10/2018 | Koukoumidis et al. |
| 2018/0321951 A1 | 11/2018 | Fitzgerald et al. |
| 2019/0018692 A1 | 1/2019 | Indyk et al. |
| 2019/0018899 A1 | 1/2019 | Podgorny et al. |
| 2019/0065576 A1 | 2/2019 | Peng et al. |
| 2019/0103035 A1 | 4/2019 | Beller et al. |
| 2020/0027095 A1 | 1/2020 | Cannon et al. |
| 2020/0134635 A1 | 4/2020 | Podgorny et al. |

(56) References Cited

U.S. PATENT DOCUMENTS

2020/0134738 A1   4/2020   Goodyear et al.
2020/0327622 A1   10/2020   Podgorny et al.
2020/0357009 A1   11/2020   Podgorny et al.

FOREIGN PATENT DOCUMENTS

| EP | 2159715 | 3/2010 |
| JP | 2014112316 | 6/2014 |
| WO | 200182202 A2 | 11/2001 |
| WO | WO 2011/053830 | 5/2011 |

OTHER PUBLICATIONS

Bartolome et al., "Processing Unstructured Voice of Customer Feedback for Improving Content Rankings in Customer Support Systems," U.S. Appl. No. 15/094,653, filed Apr. 8, 2016.

Podgorny, et al., "Content Quality and User Ranking in TurboTax AnswerXchange," Proceedings of the European Conference on Social Media, University of Brighton UK, Jul. 10-11, 2014.

Ponzanelli et al., "Understanding and Classifying the Quality of Technical Forum Questions," IEEE, 14th International Conference on Quality Software, pp. 343-352 (Year: 2014).

Blei, David M., et al. "Latent Dirichlet Allocation;" Journal of Machine Learning Research 3, Jan. 2003, pp. 993-1022.

Steyvers, Mark, et al. "Probabilistic Author-Topic Models for Information Discovery;" KDD'04, Aug. 22-25, 2004.

Mimno, David, et al., "Sparse Stochastic Inference for Latent Dirichlet Allocation," Proceedings of the 29th International Conference on Machine Learning, Edinburgh, Scotland, UK, 2012.

Blei, David M., "Probabilistic Topic Models," Communications of the ACM, Apr. 2012, vol. 55, No. 4, pp. 77-84.

Grant, Sheryl, et al., "The Human Face of Crowdsourcing: A Citizen-led Crowdsourcing Case Study;" 2013 IEEE International Conference on Big Data, Silicon Valley, CA, 2013, pp. 21-24.

Encyclopedia Britannica, "Graphical User Interface (GUI);" Sep. 5, 2015. Retrieved from the internet <URL: https://www.britannica.com/technology/graphical-user-interface>.

Wikipedia, "Widget (GUI)," Sep. 7, 2016. Retrieved from the internet <URL: https://en.wikipedia.org/w/index.php?title=Widget_(GUI)&oldid=738206274>.

Wikipedia, "Incremental Search," Jul. 22, 2016. Retrieved from the internet on Mar. 11, 2020 <URL: https://en.wikipedia.org/w/index.php?title=incremental_search&oldid=731052532>, 5 pages (Year 2016).

Dror, et al., "From Query to Question in One Click: Suggesting Synthetic Questions to Searchers," International World Wide Web Conferences Steering Committee, May 13, 2013, pp. 391-401.

Kumar et al., "Personalized Web search Using Browsing History and Domain Knowledge" International Conference on Issues and Challenges in Intelligent Computing Techniques (ICICT), IEEE 2014, pp. 493-497.

Wen et al., "Clustering user Queries of a Search Engine," Proceedings of the 10th International Conference on World Wide Web, pp. 162-168, ACM, 2001 (Year: 2001).

The Scientific Marketer, "Uplift Modelling FAQ", article date of Sep. 27, 2007, retrieved from http://scientificmarketer.com/2007/09/uplift-modelling-faq.html (Year: 2007).

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA '15, Proceedings of the $33^{rd}$ Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL: https://getsatisfaction.com/corp>.

Fitchett et al., "An Empirical Characterisation of File Retrieval," Oct. 3, 2014, University of Canterbury, Christchurch, New Zealand, Int. J. Human-Computer Studies 74 (2015), pp. 1-13 (Year: 2014).

Han et al., "Understanding and Supporting Cross-Device Web Search for Exploratory Tasks with Mobile Touch Interactions," Apr. 2015, ACM Transactions on Information System, vol. 33, No. 4, pp. 1-35, (Year: 2015).

Negoescu et al., "Modeling Flickr Communities Through Probabilistic Topic-Based Analysis," IEEE Transactions on Multimedia, vol. 12, No. 5, pp. 399-416, Aug. 2010.

\* cited by examiner

SYSTEM AND METHOD FOR RESPONDING TO SEARCH QUERIES USING CUSTOMER SELF-HELP SYSTEMS ASSOCIATED WITH A PLURALITY OF DATA MANAGEMENT SYSTEMS

RELATED APPLICATIONS

The present application is related to previously filed application Ser. No. 14/607,416, entitled "METHOD AND SYSTEM FOR PRO-ACTIVE DETECTION AND CORRECTION OF LOW QUALITY QUESTIONS IN A QUESTION AND ANSWER BASED CUSTOMER SUPPORT SYSTEM" filed in the name of Igor A. Podgorny, Matthew Cannon, Todd Frey Goodyear, and Christopher C. Gielow on Jan. 28, 2015, and assigned to assignee of the present application, which is incorporated herein, in its entirety.

The present application is related to previously filed application Ser. No. 14/685,829, entitled "METHOD AND SYSTEM FOR PRO-ACTIVELY IMPROVING ANSWER CONTENT IN A QUESTION AND ANSWER BASED CUSTOMER SUPPORT SYSTEM" filed in the name of Igor A. Podgorny, Matthew Cannon, Todd Frey Goodyear, and Christopher C. Gielow on Apr. 14, 2015, and assigned to assignee of the present application, which is incorporated herein, in its entirety.

The present application is related to previously filed application Ser. No. 14/814,765, entitled "METHOD AND SYSTEM FOR APPLYING PROBABILISTIC TOPIC MODELS TO CONTENT IN A TAX ENVIRONMENT TO IMPROVE USER SATISFACTION WITH A QUESTION AND ANSWER CUSTOMER SUPPORT SYSTEM" filed in the name of Igor A. Podgorny and Benjamin John Koonse on Jul. 31, 2015, and assigned to assignee of the present application, which is incorporated herein, in its entirety.

BACKGROUND

One of the most significant on-going costs associated with data management systems, such as stand-alone, web-based, or cloud-based tax preparation systems, personal and small business financial management systems, financial transaction management systems, and the like, is the cost of providing human-based customer support for the data management systems. Human-based customer support for the data management systems typically includes, but is not limited to, telephone support, live chat, text message, etc. It is currently estimated that the average cost of each use of these human-based customer support systems is as high as $25.

One mechanism for reducing the costs associated with human-based customer support is to provide customer self-help systems to support users of the data management systems as an alternative to human-based customer support.

Currently available customer self-help systems typically include a customer self-help database that contains linked user query data and corresponding query response data. Typically, the linked user query data and corresponding query response data is at least initially generated by: receiving user query data from a user of the data management system; allowing "trusted" users and/or employees of the data management system provider to generate query response data; providing the query response data to the user who submitted the query data; and then classifying/categorizing the resulting user query data and corresponding query response data and storing this data in the customer self-help database. Consequently, as more and more user queries are submitted and responded to, the set of linked user query data and corresponding query response data, and the number of subject matter classifications covered by the linked user query data and corresponding query response data, increases and diversifies. Eventually, a significant percentage of subsequent user queries can be answered by simply searching the customer self-help database and then providing the user with the previously generated linked user query data and corresponding query response data determined to be relevant to the subsequent user query.

Consequently, using currently available customer self-help systems, users are provided a mechanism for finding answers to their questions without resorting to the use of live customer support personnel and incurring the costs associated with live human-based customer support. In addition, a well-functioning customer self-help system benefits data management system users by potentially enabling users to find answers to questions more quickly than live customer support because live customer support usually involves waiting in a queue for the opportunity to communicate with customer support personnel.

However, using currently available customer self-help systems, content duplication and redundancy of effort is a long-standing issue and a significant source of inefficiency. This is particularly true for data management system providers who provide multiple services, such as tax preparation services, financial management services, and small business accounting services, etc., through multiple data management system offerings.

The situation arises because currently, even if a given data management system provider develops, acquires, or otherwise provides, multiple services through multiple data management system offerings, the customer self-help systems associated with each distinct data management system offered is operated and maintained as a separate self-help system, i.e., currently, each self-help system operates independently of all others. According to the current teaching in the art, data management systems, and their associated self-help systems, are offered and maintained independently from one another because currently there is no efficient and effective system to identify related content from multiple self-help systems. In addition, data management systems, and their associated self-help systems, that are offered and maintained independently from one another enable the data management systems provider to offer, operate, manage, sell, or transfer each data management system as an independent business unit. This ability/need to maintain data management systems, and their associated self-help systems, separate and distinct for each data management system offering, is indeed a very real concern for data management system providers.

Consequently, as currently taught in the art, even if information for one customer self-help system, such as a tax preparation self-help system, overlaps with, and therefore potentially contains duplicate or additional related self-help system content, as another customer self-help system, such as a small business accounting and financial management self-help system, the overlapping self-help systems are none the less operated completely independently of one another.

Even more problematic, as currently taught in the art, even if a customer self-help system for one version of a data management system, such as a standard individual tax preparation self-help system, includes common subject matter, and therefore potentially contains duplicate and/or additional relevant self-help system content, as another customer self-help system, such as a premium or self-employed version of a tax preparation self-help system, and both data management systems/versions are provided by the same data management system provider, the customer self-help systems are still typically operated completely independently of one another.

Given the current teaching in the art that data management systems and their associated customer self-help systems are to be intentionally operated independently from one another, a user of one customer self-help system offered by a given data management system provider cannot benefit from the information stored and managed by another customer self-help system offered by the same data management systems provider.

One potential solution to the inefficiency and ineffectiveness of currently available customer self-help systems would be to provide all information/content from one customer self-help system to all other customer self-help systems operated by, offered by, or otherwise associated with, the same data management systems provider. In other words, one potential solution would be to have each of the customer self-help systems copy and incorporate all of the information for all of the customer self-help systems associated with a particular data management systems provider. However, this potential solution would not only increase the cost of storing unworkably large amounts of redundant data for the data management systems provider, but it would also result in poor customer support because the duration of search times and quality of search results would be unacceptable.

Consequently, a long standing technical problem in data management system and customer self-help system arts is the current inability to provide a user of a data management system the capability to efficiently and effectively access the relevant content of two or more self-help systems associated with two or more data management systems, even when the two or more data management systems and associated two or more self-help systems are provided by the same data management system provider. This problem represents not only a significant issue for stand-alone and desktop data management systems, but is an even more pronounced Internet based issue since the amount of potentially related customer self-help system data is exponentially increased by the capabilities for data access, data transfer, data categorization, and data linking provided by the Internet.

SUMMARY

Embodiments of the present disclosure address some of the shortcomings and technical problems associated with traditional customer self-help systems by using special data training sets, resultant operational models, and one or more algorithms and processes to probabilistically identify potentially commonly relevant customer self-help system content for two or more customer self-help systems associated with two or more data management systems. In one embodiment, in response to a user query from any one of the two or more data management systems, only the identified potentially common customer self-help system content form the two or more customer self-help systems is searched for relevant response data.

Consequently, using the disclosed embodiments, the advantages of accessing relevant data from multiple customer self-help systems are provided without the disadvantages of having to search large volumes of both relevant and irrelevant self-help system content data. As a result, the disclosed embodiments represent a technical solution to the long standing technical and Internet-based problem in data management system and customer self-help system arts of the inability to provide a user of a data management system the capability to efficiently and effectively access the relevant content of two or more self-help systems associated with two or more data management systems, In one embodiment, training set data is identified and obtained from two or more data management systems and their associated customer self-help systems.

In one embodiment, one or more algorithms and processes are used to identify potentially common customer self-help system content in each of the two or more data management systems' customer self-help systems by determining a probability that customer self-help system content associated with two or more data management systems is relevant to a user query. In one embodiment, Artificial Intelligence (AI) and/or machine learning processes is/are used to identify self-help content that is responsive to a user query by analyzing and searching the two or more data management systems' customer self-help systems using one or more supervised, and/or unsupervised, and/or semi supervised, machine learning methods on the training set data to generate an initial self-help relationship model predicting the relationship between customer self-help system content of the two or more data management systems' customer self-help systems.

In one embodiment, in response to a user query received through one of the two or more data management systems' customer self-help systems, one or more of the plurality of customer self-help systems are identified as containing relevant customer self-help content. In one embodiment, only the identified relevant customer self-help systems are then searched for self-help content that is relevant and responsive to the user query.

In one embodiment, the customer self-help system then provides the relevant self-help content from the identified relevant customer self-help systems to the user.

In one embodiment, structured and/or unstructured feedback is then solicited and received from users of the customer self-help systems. In one embodiment, the feedback is used to verify or augment/improve topics, and/or classifications, associated with self-help content and customer self-help systems.

In one embodiment, the feedback is then used to generate one or more additional self-help relationship models to replace or update the initial self-help relationship model, and/or to update/improve labeled training data sets. Therefore, in one embodiment, AI is leveraged to improve the accuracy by which the plurality of customer self-help systems are searched in response to receiving a user query.

The disclosed embodiments, provide an effective and efficient solution to the long standing technical problem in the data management and customer self-help system arts of providing a user of a data management system the capability to efficiently and effectively access the relevant customer self-help content of multiple self-help systems associated with multiple data management systems. As a result, the disclosed embodiments also provide a solution to the even more pronounced Internet based issue of effectively filtering and processing the large amounts of potentially related customer self-help system content data made available through the Internet.

The disclosed embodiments do not represent an abstract idea for at least a few reasons. First, identifying customer self-help system content that is potentially relevant to multiple customer self-help systems associated with multiple data management systems, and then providing a user of a data management system the capability to efficiently and effectively access the relevant content of multiple self-help systems, is not an abstract idea because it is not merely an idea itself (e.g., cannot be performed mentally or using pen and paper), and requires the use of special data sources and data processing algorithms. Indeed, some of the disclosed embodiments include creating, and in some embodiments labeling, special training data sets, developing, applying, and dynamically modifying one or more analytics models using supervised, and/or unsupervised, and/or semi-supervised training processes, and the application of AI and structured and/or unstructured user feedback; none of which can be performed mentally or with pen and paper alone.

Second, identifying customer self-help system content that is potentially relevant to multiple customer self-help systems associated with multiple data management systems, and then providing a user of a data management system the capability to efficiently and effectively access the relevant content of multiple self-help systems, is not an abstract idea because it is not a fundamental economic practice (e.g., is not merely creating a contractual relationship, hedging, mitigating a settlement risk, etc.).

Third, identifying customer self-help system content that is potentially relevant to multiple customer self-help systems associated with multiple data management systems, and then providing a user of a data management system the capability to efficiently and effectively access the relevant content of multiple self-help systems, is not an abstract idea because it is not a method of organizing human activity (e.g., managing a game of bingo).

Fourth, although, in one embodiment, mathematics, and/or unsupervised machine learning, and/or supervised machine learning, and/or semi-supervised machine learning, may be used to generate an analytics model, identifying customer self-help system content that is potentially relevant to multiple customer self-help systems associated with multiple data management systems, and then providing a user of a data management system the capability to efficiently and effectively access the relevant content of multiple self-help systems, is not simply a mathematical relationship/formula.

Fifth, identifying customer self-help system content that is potentially relevant to multiple customer self-help systems associated with multiple data management systems, and then providing a user of a data management system the capability to efficiently and effectively access the relevant content of multiple self-help systems provides a solution to the Internet-based issue of effectively filtering and processing the large amounts of potentially related customer self-help system data made available by the Internet.

Further, identifying customer self-help system content that is potentially relevant to multiple customer self-help systems associated with multiple data management systems, and then providing a user of a data management system the capability to efficiently and effectively access the relevant content of multiple self-help systems, adds significantly to the field of data management and self-help systems by filtering searchable self-help data to provide only potentially relevant self-help content, thereby reducing the size of databases, the amount of memory required for the processing and storage of data, the bandwidth required to transfer data, and amount of data processing cycles utilized. As a result, embodiments of the present disclosure allow for reduced use of processor cycles, processor power, communications bandwidth, memory usage, and power consumption. Consequently, computing and communication systems implementing or providing the embodiments of the present disclosure are transformed into more operationally efficient devices and systems.

In addition to improving overall computing performance, identifying customer self-help system content that is potentially relevant to multiple customer self-help systems associated with multiple data management systems, and then providing a user of a data management system the capability to efficiently and effectively access the relevant content of multiple self-help systems helps build and maintain trust and loyalty in the parent data management systems. This, in turn, results in repeat customers, efficient delivery of services, and reduced abandonment of use of the parent data management system; thereby making more efficient use of both human and non-human resources.

Figure 1A:
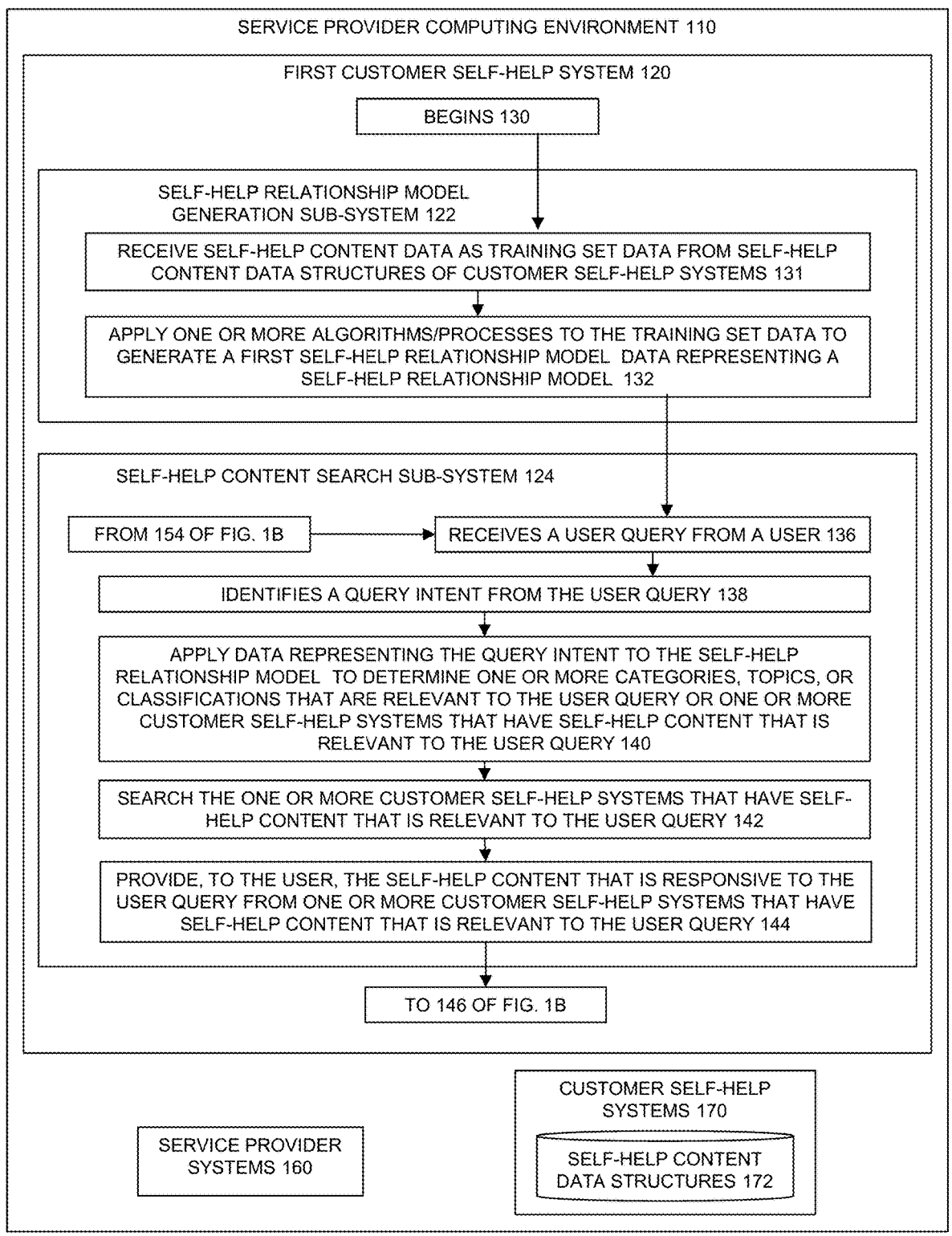
FIGS. 1A and 1B are a functional block diagram of a process for responding to search queries using a plurality of customer self-help systems associated with a plurality of data management systems, in accordance with various embodiments.

Common reference numerals are used throughout the figures and the detailed description to indicate like elements. It is to be understood that reference numerals ending in letters as tags are examples of variations of like elements, and the tagged reference numerals may or may not be illustrated in the figures. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system," "computing device," and "computing entity," include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, sub-system, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a Virtual Private Cloud (VPC); or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, communication channel, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, or entities using, or otherwise interacting with any of the methods or systems discussed herein. For instance, in various embodiments, a user can be, but is not limited to, a person, a commercial entity, an application, a service, or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, semantic, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term "data store" or "data storage device" includes, but is not limited to, any physical or virtual data source or storage device. For instance, in various embodiments, a data store or storage container can be, but is not limited to, one or more of a hard disk drive, a solid-state drive, an EEPROM, an optical disk, a server, a memory array, a database, a virtual database, a virtual memory, a virtual data directory, a non-transitory computer-readable medium, or other physical or virtual data sources.

As used herein, the term "unstructured user feedback" includes, but is not limited to, user feedback that is provided by user's in the form of text or review data originated by the user and not limited to a simple or controlled set of pre-defined response choices. In contrast, as used herein, the term "structured user feedback" includes, but is not limited to, user feedback in the form of a selection of one or more pre-defined selections or comments, e.g., a "thumbs up" symbol, star-based rating system, limited menu selection system, and the like.

Process

In one embodiment, special data training sets, resultant operational models, and one or more algorithms and processes are generated and used to probabilistically identify potentially commonly relevant customer self-help system content in two or more commonly relevant customer self-help systems associated with two or more data management systems. In one embodiment, in response to a user query from any one of the two or more data management systems, only the identified potentially commonly relevant customer self-help system content from the two or more commonly relevant customer self-help systems is searched for relevant response data.

Consequently, using the disclosed embodiments, the advantages of accessing relevant data from multiple customer self-help systems are provided without the disadvantages of having to search large volumes of both relevant and irrelevant self-help system content data. As a result, the disclosed embodiments represent a technical solution to the long standing technical and Internet based problem in data management system and customer self-help system arts of the inability to provide a user of a data management system the capability to efficiently and effectively access the relevant content of two or more self-help systems associated with two or more data management systems, In one embodiment, training set data is identified and obtained from two or more data management systems and their associated customer self-help systems.

In one embodiment, training set data is identified and obtained from two or more data management systems and their associated customer self-help systems for use with supervised machine learning algorithms, consequently, in some embodiments, the training set data is also labeled.

In one embodiment, one or more algorithms and/or processes are used to identify commonly relevant customer self-help system content in each of the two or more data management systems' customer self-help systems by determining a probability that customer self-help system content associated with two or more data management systems is relevant to a user query. In one embodiment, AI is used to identify self-help content that is responsive to a user query by analyzing and searching the two or more data management systems' customer self-help systems applying one or more supervised, and/or unsupervised, and/or semi-supervised training processes on the training set data to generate an initial self-help relationship model predicting the relationship between customer self-help system content of the two or more data management systems' customer self-help systems.

In one embodiment, in response to a user query received through one of the two or more data management systems' customer self-help systems, one or more of the plurality of customer self-help systems are identified as containing relevant customer self-help content. In one embodiment, only the identified commonly relevant customer self-help systems are then searched for self-help content that is relevant and responsive to the user query.

In one embodiment, the customer self-help system then provides the relevant self-help content from the identified relevant customer self-help systems to the user.

In one embodiment, structured and/or unstructured feedback is then solicited and received from users of the customer self-help systems. In one embodiment, the feedback is used to verify or augment/improve topics, and classifications, that are assigned self-help content and the customer self-help systems.

In one embodiment, the feedback is then used to generate one or more additional self-help relationship models to replace or update the initial self-help relationship model, and/or to update/improve labeled and/or unlabeled training data sets. Therefore, in one embodiment, AI is leveraged to improve the accuracy by which the plurality of customer self-help systems are searched in response to receiving a user query.

Figure 1B:
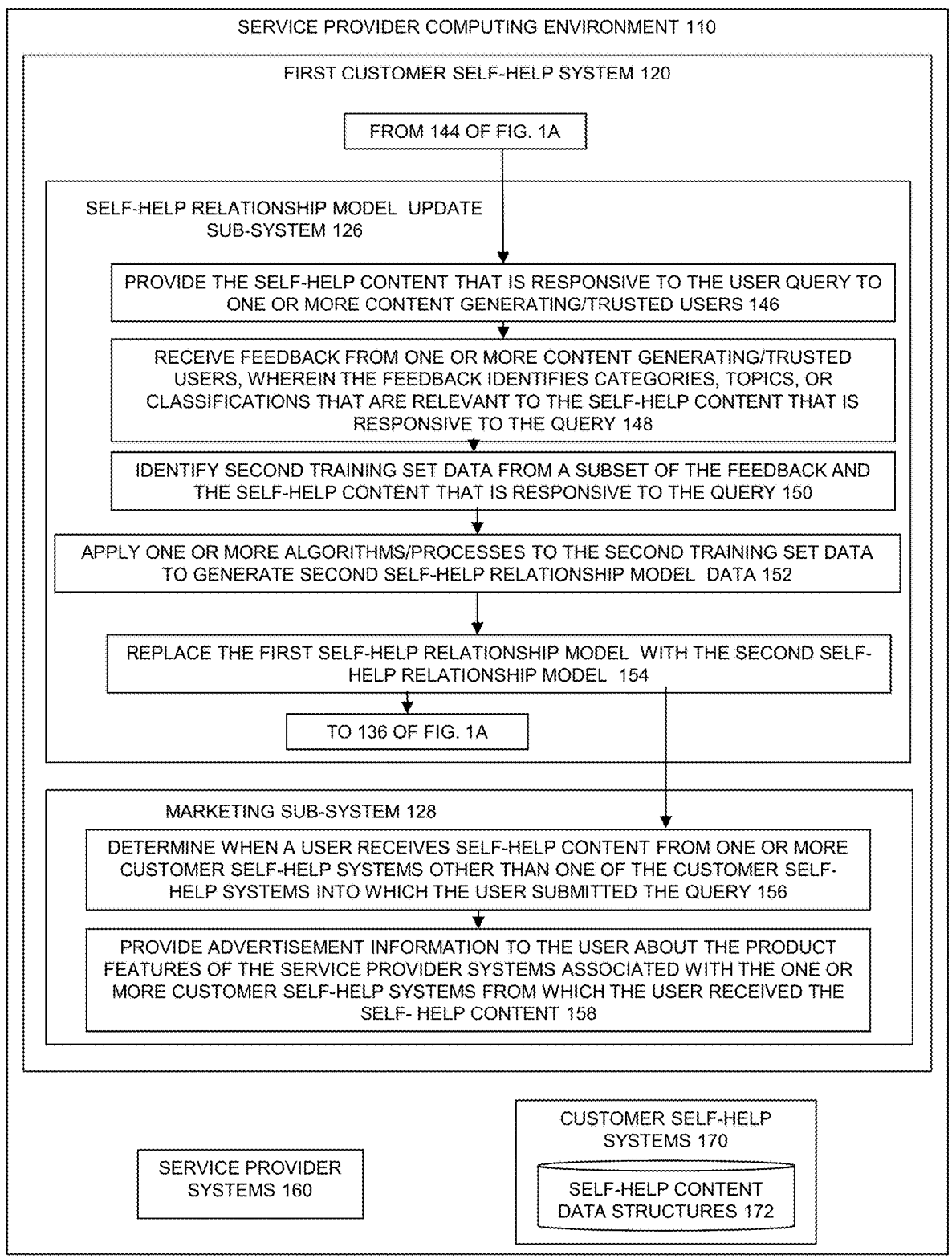

FIGS. 1A and 1B together are a functional flow block diagram of one exemplary embodiment of a process 100 for responding to search queries using a plurality of customer self-help systems associated with a plurality of data management systems. Embodiments of the present disclosure provide methods and systems for employing AI to provide personalized self-help content, from a plurality of customer self-help systems in response to a user query.

In the specific illustrative embodiment of FIGS. 1A and 1B, process 100 is implemented within service provider computing environment 110. In one embodiment, service provider computing environment 110 includes a first customer self-help system 120, service provider systems 160, and customer self-help systems 170, to implement process 100 for responding to search queries using a plurality of customer self-help systems associated with the plurality of data management system provider systems.

Specific examples of service provider systems 160 include, but are not limited to, one or more of, and/or one or more versions of, personal financial management systems, business financial management systems, tax return preparation systems, self-employed tax return preparation systems, and any other data management system, or data management system version, as discussed herein, and/or as known in the art at the time of filing, and/or as developed after the time of filing.

Specific examples of data management systems include, but are not limited to: TurboTax® available from Intuit®, Inc. of Mountain View, Calif.; TurboTax Online™ available from Intuit®, Inc. of Mountain View, Calif.; QuickBooks®, available from Intuit®, Inc. of Mountain View, Calif.; QuickBooks Online™, available from Intuit®, Inc. of Mountain View, Calif.; Mint®, available from Intuit®, Inc. of Mountain View, Calif.; Mint® Online, available from Intuit®, Inc. of Mountain View, Calif.; or various other systems discussed herein, or known to those of skill in the art at the time of filing, or as developed after the time of filing.

Examples of customer self-help systems 170 include, but are not limited to, a customer self-help system for a personal financial management system, a customer self-help system for a business financial management system, a customer self-help system for a tax return preparation system, and/or any customer self-help system for any data management system, discussed herein, or known to those of skill in the art at the time of filing, or as developed after the time of filing.

Specific examples of data management system customer self-help systems include, but are not limited to: TurboTax AnswerXchange® available from Intuit®, Inc. of Mountain View, Calif.; QuickBooks® Desktop support, available from Intuit®, Inc. of Mountain View, Calif.; QuickBooks® Online support, available from Intuit®, Inc. of Mountain View, Calif.; QuickBooks® Self-Employed support, available from Intuit®, Inc. of Mountain View, Calif.; QuickBooks® Accountant Help Hub, available from Intuit®, Inc. of Mountain View, Calif.; QuickBooks® Learn & Support, available from Intuit®, Inc. of Mountain View, Calif.; Mint® Help, available from Intuit®, Inc. of Mountain View, Calif.; or various other customer self-help systems discussed herein, and/or as known to those of skill in the art at the time of filing, and/or as developed after the time of filing.

As discussed above, currently available customer self-help systems typically include a customer self-help database that contains linked user query data and corresponding query response data. Consequently, using currently available customer self-help systems, users are provided a mechanism for finding answers to their questions without resorting to the use of live customer support personnel and incurring the costs associated with live human-based customer support.

However, as also discussed above, using currently available customer self-help systems, content duplication and redundancy of effort is a long-standing issue and a significant source of inefficiency. This is particularly true for data management system providers who provide multiple services, such as tax preparation services, financial management services, and small business accounting services, etc., through multiple data management system offerings.

The situation arises because currently, even if a given data management system provider develops, acquires, or otherwise provides, multiple services through multiple data management system offerings, the customer self-help systems associated with each distinct data management system offered is operated and maintained as a separate self-help system, i.e., currently, each self-help system operates independently of all others. According to the current teaching in the art, data management systems, and their associated self-help systems, are offered and maintained independently from one another because there is currently no effective and efficient method or system for identifying related self-help content across two or more self-help systems and because it enables the data management systems provider to offer, operate, manage, sell, or transfer each data management system as an independent business unit.

Consequently, as currently taught in the art, even if information for one customer self-help system, such as a tax preparation self-help system, overlaps with, and therefore potentially contains duplicate or additional related self-help system content, as another customer self-help system, such as a small business accounting and financial management self-help system, the customer self-help systems are none the less operated completely independently of one another.

Even more problematic, as currently taught in the art, even if a customer self-help system for one version of a data management system, such as a standard individual tax preparation self-help system, includes common subject matter, and therefore potentially contains duplicate and/or additional relevant self-help system content, as another customer self-help system, such as a premium or self-employed version of a tax preparation self-help system, and both data management systems/versions are provided by the same data management system provider, the customer self-help systems are still currently operated completely independently of one another.

In order to provide a technical solution to this long standing technical problem, in one embodiment, first customer self-help system 120 includes a number of sub-systems, functions, and modules for responding to search queries using a plurality of customer self-help systems associated with the plurality of data management systems provider systems.

In one embodiment, first customer self-help system 120 is one of the customer self-help systems 170. In one embodiment, first customer self-help system 120 is a centralized customer self-help system that analyzes and searches customer self-help systems 170 when a search query is received by one of customer self-help systems 170. In one embodiment, in order to facilitate operation of process 100 for responding to search queries using a plurality of customer self-help systems associated with a plurality of data management systems, first customer self-help system 120 includes a self-help relationship model generation sub-system 122, a self-help content search sub-system 124, a self-help relationship model update sub-system 126, and, in one embodiment, a marketing sub-system 128.

As seen in FIG. 1A, at operation 130, process 100 begins, according to one embodiment. Operation 130 then proceeds to operation 131, according to one embodiment.

At operation 131, the self-help relationship model generation sub-system 122 receives self-help content data as training set data from self-help content data structures of customer self-help systems, according to one embodiment. In one embodiment, each of the customer self-help systems 170 includes one or more self-help content data structures 172 which store and organize self-help content data (not shown) that represents self-help content for each of the customer self-help systems 170.

In one embodiment, the self-help content data includes data management systems provider generated content data and user generated content data (not separately shown) for each of the customer self-help systems 170. In various embodiments, the data management systems provider generated content data includes white papers, questions, answers, frequently asked questions, answers to frequently asked questions, tutorials, audio/video content, interactive content, or other content that can be accessed to assist users in learning about the specific subject matter associated with for each of the customer self-help systems 170 such as, but not limited to, personal finances, business finances, accounting, taxes, tax preparation, a tax return preparation system, or other relevant subject matter. In various embodiments, the data management systems provider generated content data includes definitions content such as, but not limited to, acronym definitions, definitions of application-specific terms (e.g., tax jargon), and/or definitions of terms that are related to the subject matter of the data management system.

In one embodiment, the user generated content data is crowd-sourced customer support content and includes questions and responses that are submitted by a community of question askers and response providers that use one or more of the customer self-help systems 170 or another question and answer customer support system that is associated with one or more of the service provider systems 160. In one embodiment, the user generated content includes user queries that are entered by a user into the customer self-help systems 170. In one embodiment, the user queries are not saved in the self-help content data structures 172. In one embodiment, questions that represent better articulated versions of the user queries are stored in the self-help content data structures 172.

In one embodiment, the self-help relationship model generation sub-system 122 uses at least part of the self-help content data stored by the self-help content data structures 172 as training set data representing a training set.

In one embodiment, the self-help relationship model generation sub-system 122 labels the at least part of the self-help content data stored by the self-help content data structures 172 and then uses at least part of the self-help content data stored by the self-help content data structures 172 as training set data representing a training set for supervised machine learning.

In one embodiment, operation 131 proceeds to operation 132 where, in accordance with one embodiment, self-help relationship model generation sub-system 122 applies one or more algorithms/processes, such as, but not limited to, one or more supervised, and/or unsupervised, and/or semi-supervised machine learning processes to the training set data to generate self-help relationship model data representing a self-help relationship model. In various embodiments, the one or more supervised, and/or unsupervised, and/or semi-supervised machine learning processes applied to the training set data at self-help relationship model generation sub-system 122 is a supervised algorithm. In various embodiments, one or more supervised, and/or unsupervised, and/or semi-supervised machine learning processes applied to the training set data at self-help relationship model generation sub-system 122 is an unsupervised algorithm. In various embodiments, one or more supervised, and/or unsupervised, and/or semi-supervised machine learning processes applied to the training set data at self-help relationship model generation sub-system 122 is a semi-supervised algorithm.

In one embodiment, the algorithm/process analyzes the training set data to determine one or more topics or categories of topics within the content of the training set data for each one of the self-help content data structures 172. In one embodiment, the algorithm/process includes one or more of a Latent Dirichlet Allocation ("LDA") algorithm, a Latent Semantic Indexing ("LSI") algorithm, a word embedding algorithm, a query clustering algorithm, a query de-duplication algorithm, and/or any supervised, unsupervised, or semi-supervised machine learning algorithm/process, as discussed herein, and/or as known in the art at the time of filing, and/or as developed or made available after the time of filing.

In one embodiment, operation 132 proceeds to operation 136 where, in accordance with one embodiment, self-help content search sub-system 124 receives a user query from a user.

In one embodiment, the user query is received by one of customer self-help systems 170 and is then forwarded to first customer self-help system 120. In one embodiment, the user query is received by first customer self-help system 120 as one of the customer self-help systems 170. In accordance with one embodiment, the function or role of first customer self-help system 120 is based on which of the customer self-help systems 170 receives a user query.

In one embodiment, operation 136 proceeds to operation 138, where, according to one embodiment, self-help content search sub-system 124 identifies a query intent from the user query.

In accordance with one embodiment, self-help content search sub-system 124 applies a natural language processing algorithm, such as a probabilistic topic model, to the user query to determine the query intent of the user query.

Some examples of methods and systems for determining the query intent of the user query include, but are not limited to, those set forth in previously filed application Ser. No. 14/607,416, entitled "METHOD AND SYSTEM FOR PROACTIVE DETECTION AND CORRECTION OF LOW QUALITY QUESTIONS IN A QUESTION AND ANSWER BASED CUSTOMER SUPPORT SYSTEM" filed in the name of Igor A. Podgorny, Matthew Cannon, Todd Frey Goodyear, and Christopher C. Gielow on Jan. 28, 2015, and assigned to assignee of the present application, which is incorporated herein, in its entirety.

Some examples of methods and systems for determining the query intent of the user query include, but are not limited to, those set forth in previously filed application Ser. No. 14/685,829, entitled "METHOD AND SYSTEM FOR PROACTIVELY IMPROVING ANSWER CONTENT IN A QUESTION AND ANSWER BASED CUSTOMER SUPPORT SYSTEM" filed in the name of Igor A. Podgorny, Matthew Cannon, Todd Frey Goodyear, and Christopher C. Gielow on Apr. 14, 2015, and assigned to assignee of the present application, which is incorporated herein, in its entirety.

Some examples of methods and systems for determining the query intent of the user query include, but are not limited to, those set forth in previously filed application Ser. No. 14/814,765, entitled "METHOD AND SYSTEM FOR APPLYING PROBABILISTIC TOPIC MODELS TO CONTENT IN A TAX ENVIRONMENT TO IMPROVE USER SATISFACTION WITH A QUESTION AND ANSWER CUSTOMER SUPPORT SYSTEM" filed in the name of Igor A. Podgorny and Benjamin John Koonse on Jul. 31, 2015, and assigned to assignee of the present application, which is incorporated herein, in its entirety In accordance with one embodiment, the query intent includes, but is not limited to, one or more topics associated with the user query.

In accordance with one embodiment, operation 138 proceeds to operation 140, where, according to one embodiment, self-help content search sub-system 124 applies data representing the query intent to the self-help relationship model to determine one or more categories, topics, or classifications, that are relevant to the user query or one or more customer self-help systems that have self-help content that is relevant to the user query.

In accordance with one embodiment, self-help content search sub-system 124 determines which of the one or more categories, topics, or classifications, or which of the one or more customer self-help systems, are relevant to the query intent by matching the categories, topics, or classifications of the query intent with categories, topics, or classifications associated with one or more customer self-help systems 170.

In accordance with one embodiment, operation 140 proceeds to operation 142, where, according to one embodiment, the self-help content search sub-system 124 searches the one or more customer self-help systems that have self-help content that is relevant to the user query.

In accordance with one embodiment, after determining which of customer self-help systems 170 have self-help content that is relevant to the query intent and the user query, self-help content search sub-system 124 searches the relevant ones of customer self-help systems 170.

In accordance with one embodiment, operation 142 proceeds to operation 144, where, according to one embodiment, self-help content search sub-system 124 provides to the user the self-help content that is responsive to the user query from one or more customer self-help systems that have self-help content that is relevant to the user query.

In accordance with one embodiment, operation 144 proceeds to operation 146, and to FIG. 1B, where, according to one embodiment, self-help relationship model update sub-system 126 provides the self-help content that is responsive to the user query to one or more content generating users. In various embodiments, the content generating users, also referred to herein as "trusted users," or "content generating/trusted users," are users who have been vetted by the data management systems provider as knowledgeable or whose feedback is otherwise likely to be trustworthy In accordance with one embodiment, operation 146 proceeds to operation 148, where, according to one embodiment, self-help relationship model update sub-system 126 receives structured and/or unstructured feedback from one or more content generating/trusted users, wherein the feedback identifies categories, and/or topics, and/or classifications, that are relevant to the self-help content that is responsive to the query.

Figure 4:
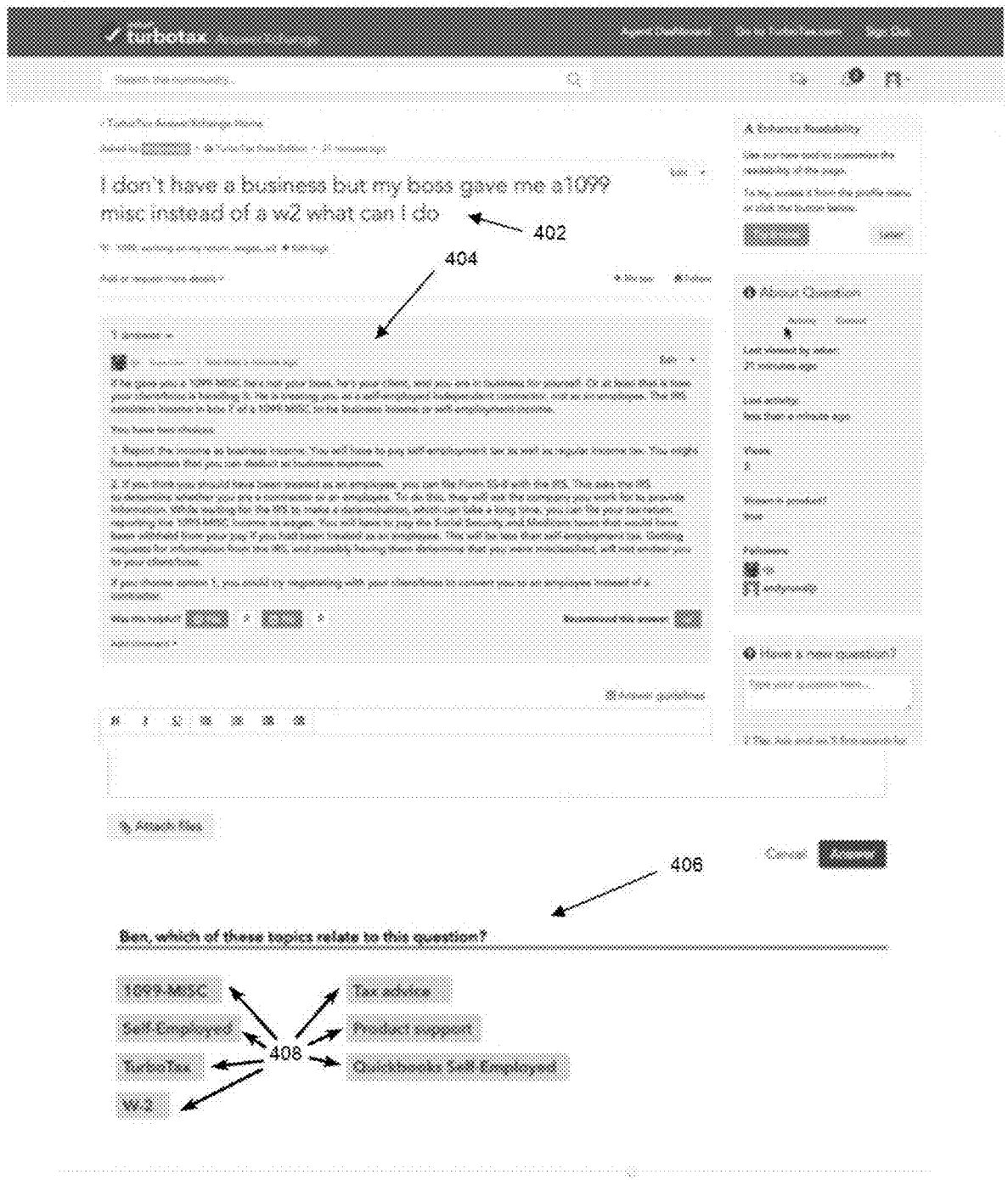
FIG. 4 is a block diagram of a user interface for soliciting structured and/or unstructured feedback from content generating/trusted users to improve the performance of a self-help relationship model, in accordance with various embodiments.

FIG. 4 is an illustrative example of a user interface 400 for soliciting feedback from content generating/trusted users to improve the performance of a self-help relationship model, according to one embodiment.

As discussed below, user interface 400 includes a user query and a response 404 that is an example of self-help content that is searched for, identified, and provided to a user in response to receipt of the user query 402 from the user.

In accordance with one embodiment, user interface 400 also includes a feedback interface 406 that displays user experience elements 408 that are associated with one or more topics that a user can select to verify, add, or remove topics that are associated with the user query 402, the response 404, or the combination of the user query 402 and the response 404. Consequently, in various embodiments, feedback interface 406 and user experience elements 408 are used to provide structured and/or unstructured feedback from one or more content generating users to self-help relationship model update sub-system 126.

In accordance with one embodiment, feedback from the content generating users determines the relevance of the topics already assigned to self-help content, e.g., a user query and response pair. In accordance with one embodiment, the feedback includes one or more of a selection of relevant topics and a confirmation of topics assigned to self-help content. In one embodiment, the provided selection of relevant topics is filtered using one of more mechanisms, such as one or more probabilistic algorithms/processes, in order to keep the list relevant topics presented to a reasonable number of the most likely topics.

Returning to FIGS. 1A and 1B, in accordance with one embodiment, operation 148 proceeds to operation 150, where, according to one embodiment, self-help relationship model update sub-system 126 identifies second training set data from a subset of the feedback and the self-help content that is responsive to the query.

In accordance with one embodiment, the second training set data includes self-help content, e.g., a user query and response pair, that has received a defined threshold of feedback data, e.g., at least 1000 feedback responses, or any other desired and defined threshold number of feedback responses, from users. In accordance with one embodiment, the users from which feedback is collected are content generating/trusted users who have been vetted by the data management systems provider as knowledgeable or whose feedback is otherwise likely to be trustworthy.

In accordance with one embodiment, operation 150 proceeds to operation 152, where, according to one embodiment, the self-help relationship model update sub-system 126 applies one or more algorithms/processes, such as, but not limited to, one or more supervised, and/or unsupervised, and/or semi-supervised machine learning processes to the second training set data to generate second self-help relationship model data representing a second self-help relationship model.

In accordance with one embodiment, the one or more supervised, and/or unsupervised, and/or semi-supervised machine learning processes generate the second self-help relationship model, which is a predictive model, defined by applying the one or more supervised, and/or unsupervised, and/or semi-supervised machine learning processes to the second training set data. In accordance with one embodiment, by applying one or more supervised, and/or unsupervised, and/or semi-supervised machine learning processes to the second training set data, a predictive model is defined and enabled to identify similarities between the self-help content and the topics assigned to the self-help content by the algorithm.

In various embodiments, the one or more supervised, and/or unsupervised, and/or semi-supervised machine learning processes include, but are not limited to, regression, logistic regression, decision trees, artificial neural networks, support vector machines, linear regression, nearest neighbor methods, distance based methods, Naive Bayes, linear discriminant analysis, k-nearest neighbor algorithm, and any other supervised, and/or unsupervised, and/or semi-supervised machine learning processes as discussed herein, and/or as known in the art at the time of filing, and/or as developed or made available after the time of filing.

In accordance with one embodiment, operation 152 proceeds to operation 154, where, according to one embodiment, self-help relationship model update sub-system 126 replaces the first self-help relationship model with the second self-help relationship model.

In accordance with one embodiment, operation 154 returns to operation 136 of FIG. 1A to complete a feedback and AI loop for continuously improving operation of the self-help relationship model.

In accordance with one embodiment, operation 154 additionally proceeds to operation 156, where, according to one embodiment, marketing sub-system 128 determines when a user receives self-help content from one or more customer self-help systems other than one of the customer self-help systems into which the user submitted the query.

In accordance with one embodiment, operation 156 proceeds to operation 158, where, according to one embodiment, marketing sub-system 128 provides advertisement information to the user about the product features of the service provider systems associated with the one or more customer self-help systems from which the user received the self-help content.

In accordance with one embodiment, by providing advertisement information about data management systems provider systems that are relevant to the user query, the user may be more likely to understand the value of the advertised data management systems provider system and may be more likely to subscribe to, purchase, or use the services of the advertised data management systems provider system.

Figure 2:
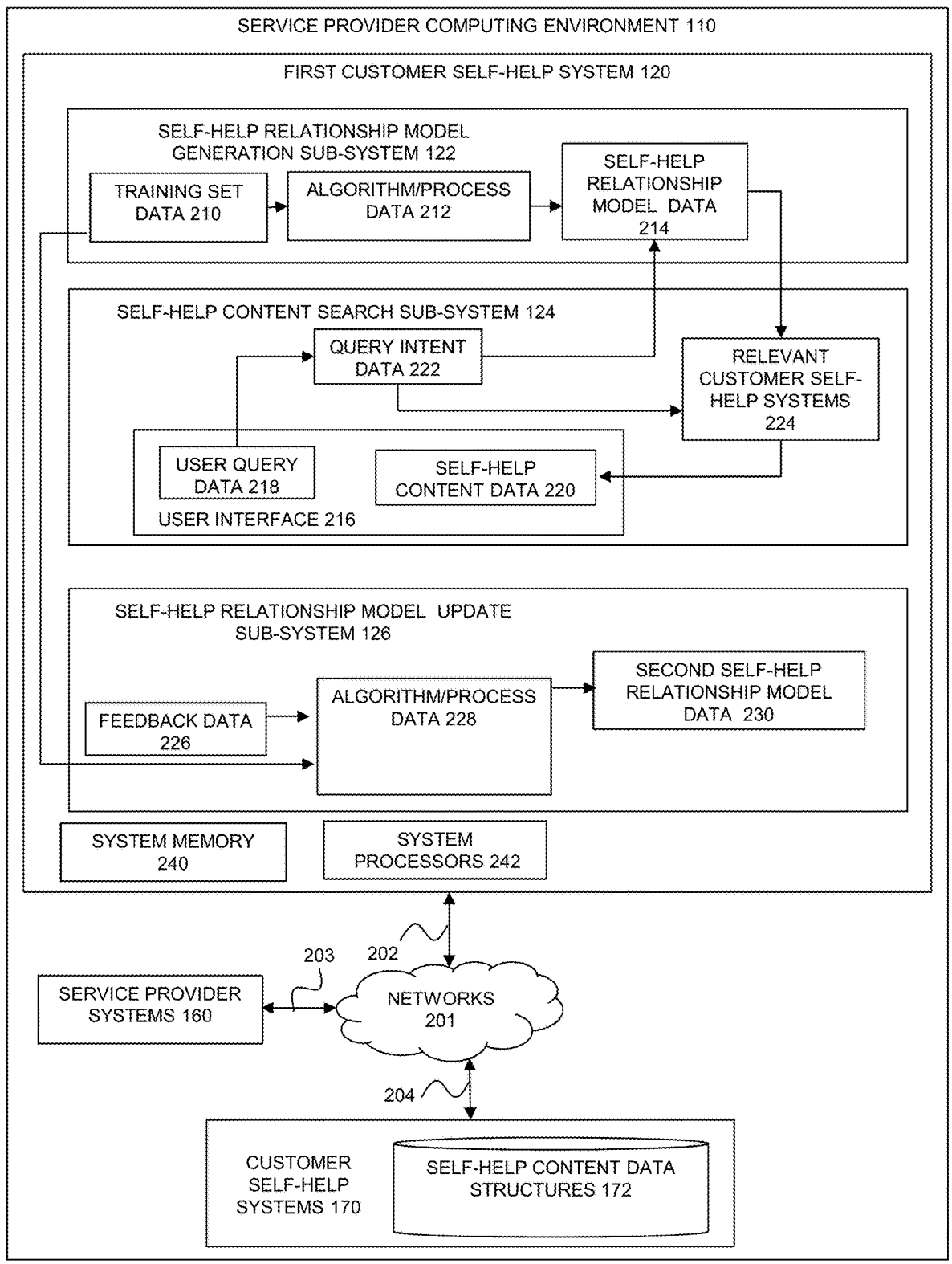
FIG. 2 is a functional block diagram of a production environment for responding to search queries using a plurality of customer self-help systems associated with a plurality of data management systems, in accordance with various embodiments.

FIG. 2 is a functional block diagram of a production environment 200 for responding to search queries using a plurality of customer self-help systems associated with a plurality of data management systems, in accordance with various embodiments. In accordance with one embodiment, production environment 200 includes the service provider computing environment 110.

In accordance with one embodiment, service provider computing environment 110 includes the first customer self-help system 120, service provider systems 160, and customer self-help systems 170 of FIGS. 1A and 1B. In accordance with one embodiment, first customer self-help system 120, service provider systems 160, and customer self-help systems 170 are communicatively coupled to each other through the one or more physical or virtual networks 201, in accordance with the one illustrative embodiment of FIG. 2, with communication channel 202, communication channel 203, and communication channel 204.

In accordance with one embodiment, service provider computing environment 110 represents one or more computing systems such as a server or distribution center that is configured to receive, execute, and host one or more data storage systems, according to one embodiment. In accordance with one embodiment, service provider computing environment 110 represents one or more of a traditional data center computing environment, a virtual asset computing environment, e.g., a cloud computing environment, or a hybrid between a traditional data center computing environment and a virtual asset computing environment.

In accordance with one embodiment, service provider computing environment 110 uses first customer self-help system 120 to: train a self-help relationship model; receive a user query; apply the user query to the self-help relationship model to identify relevant customer self-help systems, e.g., relevant to the user query; and to search the relevant customer self-help systems to identify self-help content that is responsive to the user query.

In accordance with one embodiment, first customer self-help system 120 is one of customer self-help systems 170. In accordance with one embodiment, first customer self-help system 120 is whichever one of customer self-help systems 170 that receives a user query, such that multiple ones of customer self-help systems 170 may function as first customer self-help system 120 at any given time.

In accordance with one embodiment, first customer self-help system 120 is a centralized customer self-help system that searches customer self-help systems 170 for self-help content that is responsive to a user query received by first customer self-help system 120. In accordance with one embodiment, first customer self-help system 120 includes self-help relationship model generation sub-system 122, self-help content search sub-system 124, and self-help relationship model update sub-system 126, as also discussed with respect to FIGS. 1A and 1B.

Returning to FIG. 2, in accordance with one embodiment, first customer self-help system 120 uses self-help relationship model generation sub-system 122 to generate a self-help relationship model. In accordance with one embodiment, the self-help relationship model is used to determine which of customer self-help systems 170 have self-help content that is relevant to a user query received by first customer self-help system 120. In accordance with one embodiment, the self-help relationship model determines which of the customer self-help systems 170 have self-help content that is relevant to a user query by identifying those of customer self-help systems 170 that have self-help content with topics that are similar to, or the same as, one or more topics of the user query.

In accordance with one embodiment, in order to generate the self-help relationship model, self-help relationship model generation sub-system 122 includes training set data 210 and algorithm/process data 212. In accordance with one embodiment, training set data 210 is a subset of self-help content data that represents the self-help content and which is stored in self-help content data structures 172. In accordance with one embodiment, self-help relationship model generation sub-system 122 applies algorithm/process data 212, representing a supervised, an unsupervised, or semi-supervised process, to training set data 210 to generate self-help relationship model data 214, which represents a self-help relationship model.

In accordance with various embodiments, the supervised, unsupervised, or semi-supervised process of algorithm/process data 212, includes one or more of: a Latent Dirichlet Allocation ("LDA") algorithm; a Latent Semantic Indexing ("LSI") algorithm; a word embedding algorithm; a query clustering algorithm; a query de-duplication algorithm; and/or any supervised, unsupervised, or semi-supervised algorithm, as discussed herein, and/or as known in the art at the time of filing, and/or as developed/made available after the time of filing. In one embodiment, the self-help relationship model includes a table or data structure of topics that are associated with each of customer self-help systems 170.

In accordance with one embodiment, first customer self-help system 120 uses self-help content search sub-system 124 to locate and identify self-help content that is responsive to a user query received from a user. In accordance with one embodiment, self-help content search sub-system 124 includes a user interface 216, through which self-help content search sub-system 124 receives user query data 218 representing a user query, and by which self-help content search sub-system 124 provides self-help content data 220 representing self-help content, to a user in response to receipt of user query data 218.

In accordance with one embodiment, self-help content search sub-system 124 identifies query intent data 222 representing the query intent of user query data 218, according to one embodiment. In accordance with one embodiment, self-help content search sub-system 124 applies query intent data 222 to self-help relationship model data 214 to identify one or more relevant customer self-help systems 224. In accordance with one embodiment, self-help content search sub-system 124 applies one or more natural language processing algorithms to user query data 218 to identify topics of user query data 218. In accordance with one embodiment, the topics of the user query data 218 are the query intent represented by query intent data 222.

As noted above, some examples of methods and systems for determining the query intent of the user query include, but are not limited to, those set forth in previously filed application Ser. No. 14/607,416, entitled "METHOD AND SYSTEM FOR PRO-ACTIVE DETECTION AND CORRECTION OF LOW QUALITY QUESTIONS IN A QUESTION AND ANSWER BASED CUSTOMER SUPPORT SYSTEM" filed in the name of Igor A. Podgorny, Matthew Cannon, Todd Frey Goodyear, and Christopher C. Gielow on Jan. 28, 2015, and assigned to assignee of the present application, which is incorporated herein, in its entirety.

As also noted above, some examples of methods and systems for determining the query intent of the user query include, but are not limited to, those set forth in previously filed application Ser. No. 14/685,829, entitled "METHOD AND SYSTEM FOR PRO-ACTIVELY IMPROVING ANSWER CONTENT IN A QUESTION AND ANSWER BASED CUSTOMER SUPPORT SYSTEM" filed in the name of Igor A. Podgorny, Matthew Cannon, Todd Frey Goodyear, and Christopher C. Gielow on Apr. 14, 2015, and assigned to assignee of the present application, which is incorporated herein, in its entirety.

As also noted above, some examples of methods and systems for determining the query intent of the user query include, but are not limited to, those set forth in previously filed application Ser. No. 14/814,765, entitled "METHOD AND SYSTEM FOR APPLYING PROBABILISTIC TOPIC MODELS TO CONTENT IN A TAX ENVIRONMENT TO IMPROVE USER SATISFACTION WITH A QUESTION AND ANSWER CUSTOMER SUPPORT SYSTEM" filed in the name of Igor A. Podgorny and Benjamin John Koonse on Jul. 31, 2015, and assigned to assignee of the present application, which is incorporated herein, in its entirety.

In accordance with one embodiment, first customer self-help system 120 uses self-help relationship model update sub-system 126 to update the self-help relationship model data 214 that is used to identify relevant customer self-help systems 224 that are relevant to user query data 218 and from which self-help content data 220 is retrieved.

In accordance with one embodiment, self-help relationship model update sub-system 126 includes feedback data 226, algorithm/process data 228, and second self-help relationship model data 230. In accordance with one embodiment, feedback data 226 represents feedback received from content generating/trusted users, e.g., trusted users, of one or more of customer self-help systems 170. In accordance with one embodiment, the process represented by algorithm/process data 228 is applied to one or more of feedback data 226, training set data 210, query intent data 222, and/or relevant customer self-help systems 224 to generate a second self-help relationship model represented by second self-help relationship model data 230.

In accordance with various embodiments, algorithm/process data 228 represents one or more of a number of classifier and/or topic algorithms. In accordance with one embodiment, algorithm/process data 228 represents one or more classifier and/or topic algorithms that include, but are not limited to, regression, logistic regression, decision trees, artificial neural networks, support vector machines, linear regression, nearest neighbor methods, distance based methods, Naive Bayes, linear discriminant analysis, k-nearest neighbor algorithm, and any other learning process as discussed herein, and/or as known in the art at the time of filing, and/or as developed/becomes available after the time of filing.

Although the features and functionality of the production environment 200 are illustrated or described in terms of individual or modularized components, sub-systems, engines, modules, models, databases/data stores, and systems, one or more of the functions of one or more of the components, engines, modules, models, databases/data stores, or systems are functionally combinable with one or more other described or illustrated components, engines, modules, models, databases/data stores, and systems, according to various embodiments.

In addition, each of the described sub-systems, engines, modules, models, databases/data stores, characteristics, user experiences, content, and systems are data that can be stored in system memory 240 and executed by one or more system processors 242, according to various embodiments.

Figure 3A:
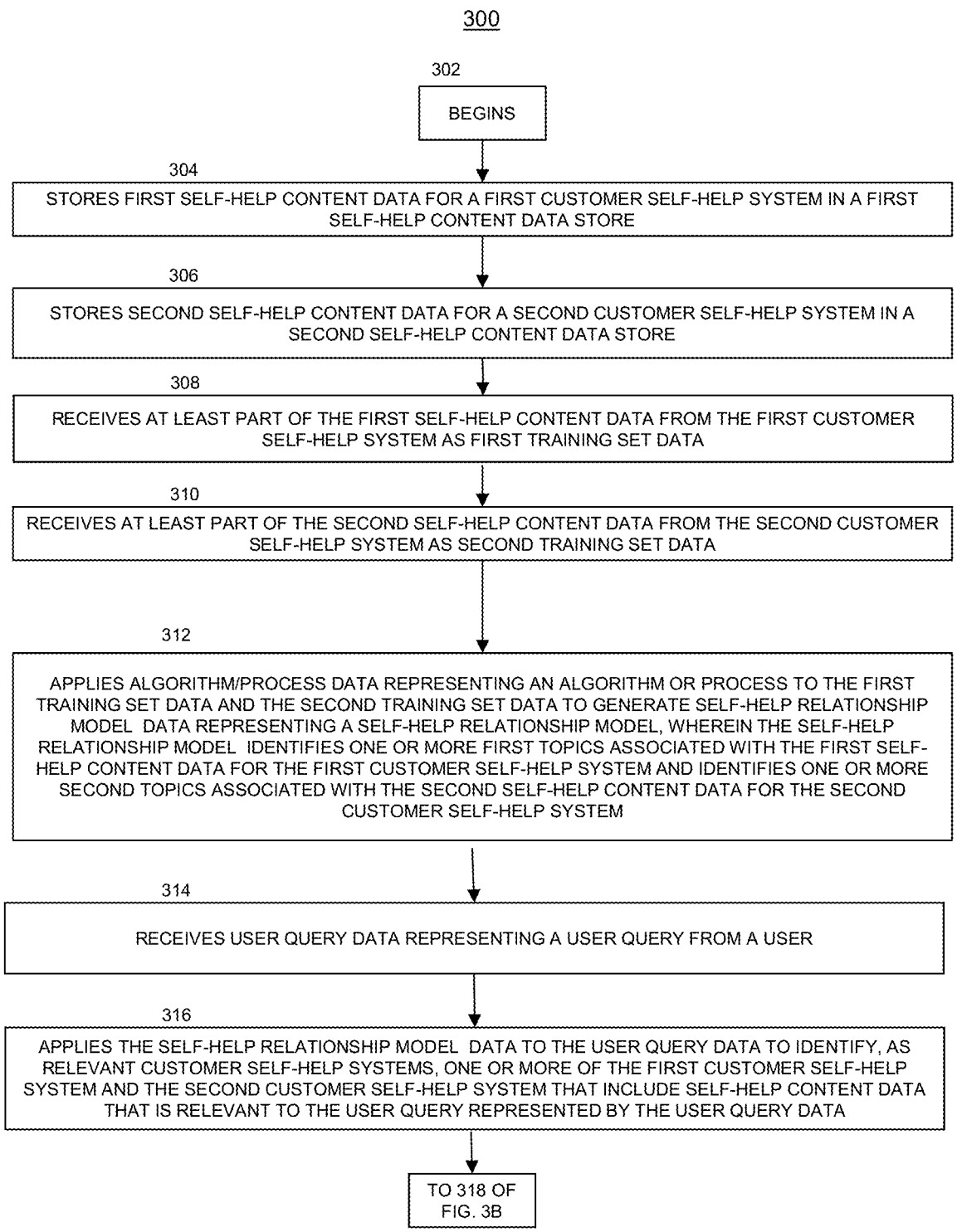
FIGS. 3A and 3B are together a flow diagram of a process for responding to search queries using a plurality of customer self-help systems associated with a plurality of data management systems, in accordance with various embodiments.
Figure 3B:
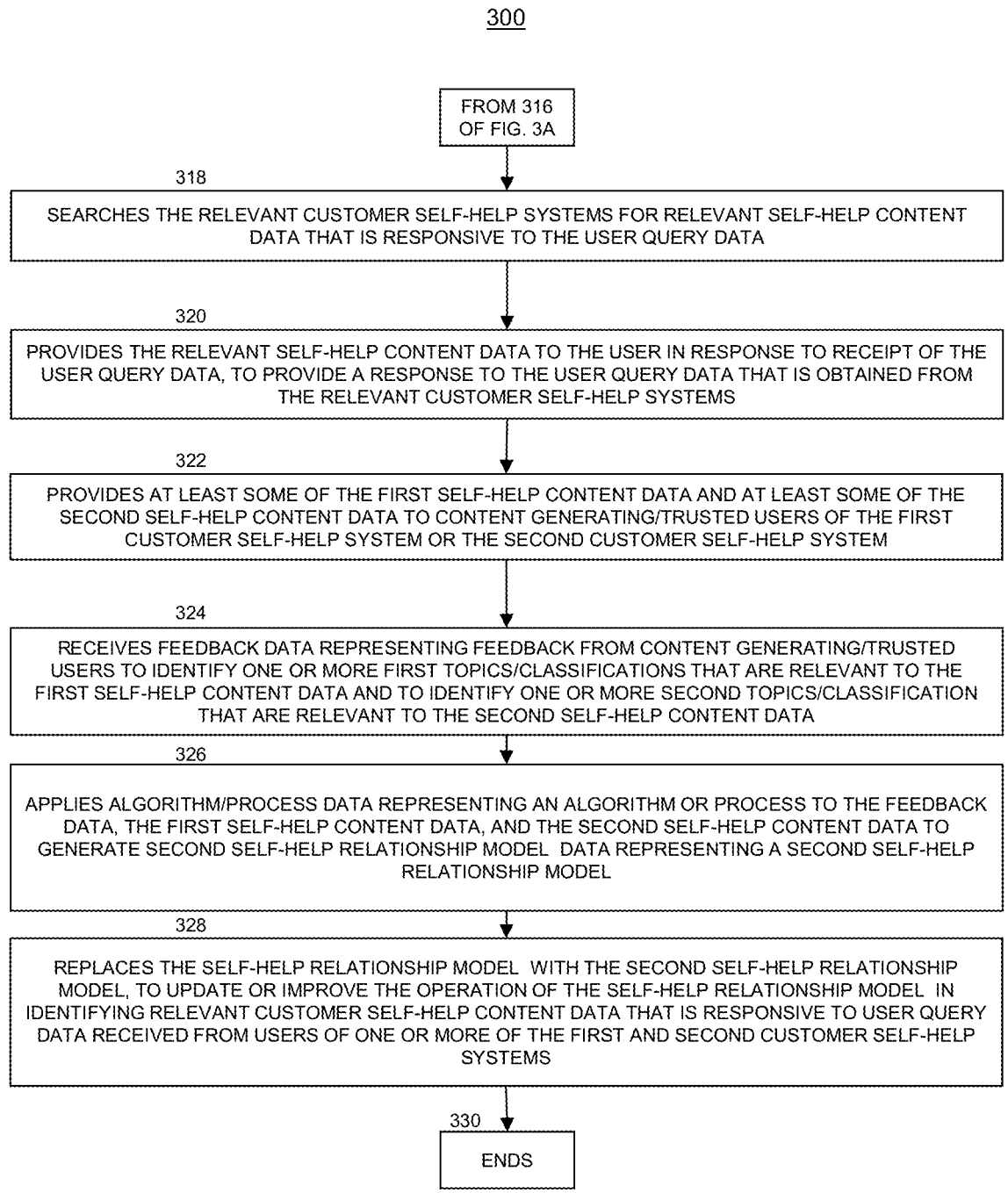

FIGS. 3A and 3B illustrate one embodiment of a process 300 for responding to search queries using a plurality of customer self-help systems associated with a plurality of data management systems, according to one embodiment.

In accordance with one embodiment, process 300 BEGINS at operation 302. In accordance with one embodiment, operation 302 then proceeds to operation 304, where, according to one embodiment, process 300 STORES FIRST SELF-HELP CONTENT DATA FOR A FIRST CUSTOMER SELF-HELP SYSTEM IN A FIRST SELF-HELP CONTENT DATA STORE.

In accordance with one embodiment, operation 304 proceeds to operation 306, where, according to one embodiment, process 300 STORES SECOND SELF-HELP CONTENT DATA FOR A SECOND CUSTOMER SELF-HELP SYSTEM IN A SECOND SELF-HELP CONTENT DATA STORE.

In accordance with one embodiment, operation 306 proceeds to operation 308, where, according to one embodiment, process 300 RECEIVES AT LEAST PART OF THE FIRST SELF-HELP CONTENT DATA FROM THE FIRST CUSTOMER SELF-HELP SYSTEM AS FIRST TRAINING SET DATA.

In accordance with one embodiment, operation 308 proceeds to operation 310, where, according to one embodiment, process 300 RECEIVES AT LEAST PART OF THE SECOND SELF-HELP CONTENT DATA FROM THE SECOND CUSTOMER SELF-HELP SYSTEM AS SECOND TRAINING SET DATA.

In accordance with one embodiment, operation 310 proceeds to operation 312, where, according to one embodiment, process 300 APPLIES ALGORITHM/PROCESS DATA REPRESENTING AN ALGORITHM OR PROCESS TO THE FIRST TRAINING SET DATA AND THE SECOND TRAINING SET DATA TO GENERATE SELF- HELP RELATIONSHIP MODEL DATA REPRESENTING A SELF-HELP RELATIONSHIP MODEL, WHEREIN THE SELF-HELP RELATIONSHIP MODEL IDENTIFIES ONE OR MORE FIRST TOPICS ASSOCIATED WITH THE FIRST SELF-HELP CONTENT DATA FOR THE FIRST CUSTOMER SELF-HELP SYSTEM AND IDENTIFIES ONE OR MORE SECOND TOPICS ASSOCIATED WITH THE SECOND SELF-HELP CONTENT DATA FOR THE SECOND CUSTOMER SELF-HELP SYSTEM.

In accordance with one embodiment, operation 312 proceeds to operation 314, where, according to one embodiment, process 300 RECEIVES USER QUERY DATA REPRESENTING A USER QUERY FROM A USER.

In accordance with one embodiment, operation 314 proceeds to operation 316, where, according to one embodiment, process 300 APPLIES THE SELF-HELP RELATIONSHIP MODEL DATA TO THE USER QUERY DATA TO IDENTIFY, AS RELEVANT CUSTOMER SELF-HELP SYSTEMS, ONE OR MORE OF THE FIRST CUSTOMER SELF-HELP SYSTEM AND THE SECOND CUSTOMER SELF-HELP SYSTEM THAT INCLUDE SELF-HELP CONTENT DATA THAT IS RELEVANT TO THE USER QUERY REPRESENTED BY THE USER QUERY DATA.

In accordance with one embodiment, operation 316 proceeds to operation 318, where, according to one embodiment, process 300 SEARCHES THE RELEVANT CUSTOMER SELF-HELP SYSTEMS FOR RELEVANT SELF-HELP CONTENT DATA THAT IS RESPONSIVE TO THE USER QUERY DATA.

In accordance with one embodiment, operation 318 proceeds to operation 320, where, according to one embodiment, process 300 PROVIDES THE RELEVANT SELF-HELP CONTENT DATA TO THE USER IN RESPONSE TO RECEIPT OF THE USER QUERY DATA, TO PROVIDE A RESPONSE TO THE USER QUERY DATA THAT IS OBTAINED FROM THE RELEVANT CUSTOMER SELF-HELP SYSTEMS.

In accordance with one embodiment, operation 320 proceeds to operation 322, where, according to one embodiment, process 300 PROVIDES AT LEAST SOME OF THE FIRST SELF-HELP CONTENT DATA AND AT LEAST SOME OF THE SECOND SELF-HELP CONTENT DATA TO CONTENT GENERATING/TRUSTED USERS OF THE FIRST CUSTOMER SELF-HELP SYSTEM OR THE SECOND CUSTOMER SELF-HELP SYSTEM.

In accordance with one embodiment, operation 322 proceeds to operation 324, where, according to one embodiment, process 300 RECEIVES FEEDBACK DATA REPRESENTING FEEDBACK FROM CONTENT GENERATING/TRUSTED USERS TO IDENTIFY ONE OR MORE FIRST TOPICS THAT ARE RELEVANT TO THE FIRST SELF-HELP CONTENT DATA AND TO IDENTIFY ONE OR MORE SECOND TOPICS THAT ARE RELEVANT TO THE SECOND SELF-HELP CONTENT DATA.

As noted above, FIG. 4 is an illustrative example of a user interface 400 for soliciting feedback from content generating/trusted users to improve the performance of a self-help relationship model, according to one embodiment.

In accordance with one embodiment, user interface 400 includes a user query 402 that is an example of a statement or question that might be submitted by a user to a customer self-help system to retrieve a response from the customer self-help system.

In accordance with one embodiment, user interface 400 includes a response 404 that is an example of self-help content that is searched for, identified, and provided to a user in response to receipt of the user query 402 from the user.

In accordance with one embodiment, user interface 400 includes a feedback interface 406 that displays user experience elements 408 that are associated with one or more topics that a user can select to verify, add, or remove topics that are associated with the user query 402, the response 404, or the combination of the user query 402 and the response 404.

In the specific illustrative example of FIG. 4, user experience elements 408 are depicted as buttons, but other user experience elements may be used, such as, but not limited to, radio buttons, check boxes, and slide buttons, according to various embodiments.

Returning to FIGS. 3A and 3B, in accordance with one embodiment, operation 324 proceeds to operation 326, where, according to one embodiment, process 300 APPLIES ALGORITHM/PROCESS DATA REPRESENTING AN ALGORITHM OR PROCESS TO THE FEEDBACK DATA, THE FIRST SELF-HELP CONTENT DATA, AND THE SECOND SELF-HELP CONTENT DATA TO GENERATE SECOND SELF-HELP RELATIONSHIP MODEL DATA REPRESENTING A SECOND SELF-HELP RELATIONSHIP MODEL.

In accordance with one embodiment, operation 326 proceeds to operation 328, where, according to one embodiment, process 300 REPLACES THE SELF-HELP RELATIONSHIP MODEL WITH THE SECOND SELF-HELP RELATIONSHIP MODEL, TO UPDATE OR IMPROVE THE OPERATION OF THE SELF-HELP RELATIONSHIP MODEL IN IDENTIFYING RELEVANT CUSTOMER SELF-HELP CONTENT DATA THAT IS RESPONSIVE TO USER QUERY DATA RECEIVED FROM USERS OF ONE OR MORE OF THE FIRST AND SECOND CUSTOMER SELF-HELP SYSTEMS.

In accordance with one embodiment, operation 328 proceeds to operation 330, where, according to one embodiment, process 300 ENDS.

The embodiments disclosed herein represent technical solutions to some of technical problems associated with traditional customer self-help systems. In one embodiment, one or more algorithms and processes are used to probabilistically identify potentially common customer self-help system content that is relevant to two or more customer self-help systems associated with two or more data management systems. In one embodiment, all the identified potentially common customer self-help system content is then linked for searching in response to a user query from any of the two or more data management systems.

Consequently, in one embodiment, customer self-help system content that is determined to be potentially relevant to multiple customer self-help systems associated with multiple data management systems is identified and then only the identified potentially relevant customer self-help system content is searched in response to a user query initiated from any of the customer self-help systems. As a result, using the disclosed embodiments, the advantages of accessing relevant data from a shared customer self-help system are provided without the disadvantages of having to search potentially unworkable amounts of both relevant and irrelevant self-help system content.

The disclosed embodiments make use of responses to queries stored in customer self-help systems other than the one that a user is currently using, thereby expanding the scope of trusted self-help content used to respond to a user In addition, the disclosed embodiments, consolidate multiple customer self-help systems associated with multiple data management systems provider systems, without the financial and physical overhead associated with creating multiple exact replicas of all the customer self-help systems.

In addition, by identifying customer self-help system content that is potentially relevant to multiple customer self-help systems associated with multiple data management systems, and then providing a user of a data management system the capability to efficiently and effectively access the relevant content of multiple self-help systems, the disclosed embodiments increase the likelihood of providing a relevant response to a user query.

In addition, in one embodiment, trusted user feedback and AI are leveraged to improve the accuracy by which self-help content is provided to users in response to user queries.

Identifying customer self-help system content that is potentially relevant to multiple customer self-help systems associated with multiple data management systems, and then providing a user of a data management system the capability to efficiently and effectively access the relevant content of multiple self-help systems, adds significantly to the field of data management and self-help systems by filtering searchable self-help data to provide only potentially relevant self-help content, thereby reducing the size of databases, storage of data, transfer of data, and amount of data processing.

As a result, embodiments of the present disclosure allow for reduced use of processor cycles, processor power, communications bandwidth, memory, and power consumption. Consequently, computing and communication systems implementing or providing the embodiments of the present disclosure are transformed into more operationally efficient devices and systems.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, the model features, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for identifying relevant self-help content among multiple self-help systems, comprising:
   one or more processors; and
   at least one memory coupled to the one or more processors and storing instructions that, when executed by the one or more processors, cause the system to perform operations including:
      storing first self-help content in a first data store of a first self-help system of a plurality of self-help systems deployed by a same service provider, each self-help system of the plurality of self-help systems associated with a respective service of a plurality of services provided by the same service provider, and each respective service associated with a respective set of users of a plurality of users managed by the same service provider;
      storing second self-help content in a second data store of a second self-help system of the plurality of self-help systems;
      receiving first training set data based on a portion of the first self-help content;
      receiving second training set data based on the second self-help content;
      applying one or more algorithms of a machine learning process to the first and second training set data;
      generating a first self-help relationship model that identifies relevant data associated with the first and second self-help content based on the applying;
      receiving a user query;
      applying the first self-help relationship model to the user query;
      determining that the first and second self-help systems include data relevant to the user query based on the application of the first self-help relationship model;
      identifying a first portion of relevant data in the first data store of the first self-help system based on the application of the first self-help relationship model;
      identifying a second portion of relevant data in the second data store of the second self-help system based on the application of the first self-help relationship model;
      searching for content responsive to the user query only within the identified first and second portions of relevant data;
      generating a response to the user query based on the searching;
      providing a portion of the first self-help content to a first portion of users associated with the first self-help system;
      providing a portion of the second self-help content to a second portion of users associated with the second self-help system;
      receiving feedback data from the first and second portions of users based on the provided portions;
      applying the one or more algorithms of the machine learning process to the feedback data; and
      generating a second self-help relationship model that identifies relevant data with higher accuracy than the first self-help relationship model.

2. The system of claim 1, wherein the user query is received through the first self-help system or the second self-help system.

3. The system of claim 1, wherein the one or more algorithms include at least one of a Latent Dirichlet Allocation ("LDA") algorithm, a Latent Semantic Indexing ("LSI") algorithm, a word embedding algorithm, a query clustering algorithm, or a query de-duplication algorithm.

4. The system of claim 1, wherein the second self-help relationship model includes a table of topics associated with the first and second self-help systems.

5. The system of claim 1, wherein the first and second portions of relevant data each relate to a same topic associated with the user query.

6. The system of claim 1, wherein execution of the instructions causes the system to perform operations further including:
   applying a natural language processing algorithm to the user query; and
   identifying a query intent for the user query based on the applying of the natural language processing algorithm.

7. The system of claim 6, wherein the query intent is associated with a topic of the user query.

8. The system of claim 1, wherein the one or more algorithms are based on at least one of regression, logistic regression, decision trees, artificial neural networks, support vector machines, linear regression, nearest neighbor methods, distance based methods, naive Bayes, linear discriminant analysis, or a k-nearest neighbor algorithm.

9. The system of claim 1, wherein execution of the instructions causes the system to perform operations further including:
   acquiring an advertisement for the second self-help system; and
   providing the advertisement to a user of the first self-help system that is not presently a customer of the second self-help system.

10. The system of claim 1, wherein the machine learning process is at least one of a supervised learning process, an unsupervised learning process, or a semi-supervised learning process.

11. A method for identifying relevant self-help content among multiple self-help systems, the method performed by one or more processors of a system and comprising:
    storing first self-help content in a first data store of a first self-help system of a plurality of self-help systems deployed by a same service provider, each self-help system of the plurality of self-help systems associated with a respective service of a plurality of services provided by the same service provider, and each respective service associated with a respective set of users of a plurality of users managed by the same service provider;

storing second self-help content in a second data store of a second self-help system of the plurality of self-help systems;

receiving first training set data based on a portion of the first self-help content;

receiving second training set data based on the second self-help content;

applying one or more algorithms of a machine learning process to the first and second training set data;

generating a first self-help relationship model that identifies relevant data associated with the first and second self-help content based on the applying;

receiving a user query;

applying the first self-help relationship model to the user query;

determining that the first and second self-help systems include data relevant to the user query based on the application of the first self-help relationship model;

identifying a first portion of relevant data in the first data store of the first self-help system based on the application of the first self-help relationship model;

identifying a second portion of relevant data in the second data store of the second self-help system based on the application of the first self-help relationship model;

searching for content responsive to the user query only within the identified first and second portions of relevant data generating a response to the user query based on the searching;

providing a portion of the first self-help content to a first portion of users associated with the first self-help system;

providing a portion of the second self-help content to a second portion of users associated with the second self-help system;

receiving feedback data from the first and second portions of users based on the provided portions;

applying the one or more algorithms of the machine learning process to the feedback data; and generating a second self-help relationship model that identifies relevant data with higher accuracy than the first self-help relationship model.

12. The method of claim 11, wherein the user query is received through the first self-help system or the second self-help system.

13. The method of claim 11, wherein the one or more algorithms include at least one of a Latent Dirichlet Allocation ("LDA") algorithm, a Latent Semantic Indexing ("LSI") algorithm, a word embedding algorithm, a query clustering algorithm, or a query de-duplication algorithm.

14. The method of claim 11, wherein the second self-help relationship model includes a table of topics associated with the first and second self-help systems.

15. The method of claim 11, wherein the first and second portions of relevant data each relate to a same topic associated with the user query.

16. The method of claim 11, further comprising:
applying a natural language processing algorithm to the user query; and
identifying a query intent for the user query based on the applying of the natural language processing algorithm.

17. The method of claim 16, wherein the query intent is associated with a topic of the user query.

18. The method of claim 11, wherein the one or more algorithms are based on at least one of regression, logistic regression, decision trees, artificial neural networks, support vector machines, linear regression, nearest neighbor methods, distance based methods, naive Bayes, linear discriminant analysis, or a k-nearest neighbor algorithm.

19. The method of claim 11, wherein the machine learning process is at least one of a supervised learning process, an unsupervised learning process, or a semi-supervised learning process.

* * * * *